(12) United States Patent
Papadopoulos et al.

(10) Patent No.: US 8,059,732 B2
(45) Date of Patent: Nov. 15, 2011

(54) METHOD AND APPARATUS FOR WIDEBAND TRANSMISSION FROM MULTIPLE NON-COLLOCATED BASE STATIONS OVER WIRELESS RADIO NETWORKS

(75) Inventors: Haralabos Papadopoulos, San Jose, CA (US); Carl-Erik W. Sundberg, Sunnyvale, CA (US)

(73) Assignee: NTT DoCoMo, Inc., Tokyo (JP)

(*) Notice: Subject to any disclaimer, the term of this patent is extended or adjusted under 35 U.S.C. 154(b) by 960 days.

(21) Appl. No.: 11/939,353

(22) Filed: Nov. 13, 2007

(65) Prior Publication Data

US 2008/0130769 A1   Jun. 5, 2008

Related U.S. Application Data

(60) Provisional application No. 60/861,539, filed on Nov. 28, 2006.

(51) Int. Cl.
H04K 1/10 (2006.01)
(52) U.S. Cl. .......................... 375/260; 375/341
(58) Field of Classification Search ................. 370/310, 370/331; 375/232, 260, 262, 267, 224, 340, 375/341
See application file for complete search history.

(56) References Cited

U.S. PATENT DOCUMENTS

| | | | |
|---|---|---|---|
| 5,903,842 A | 5/1999 | Wang et al. | |
| 5,982,327 A | 11/1999 | Vook et al. | |
| 6,629,287 B1 | 9/2003 | Brink | |
| 6,804,307 B1 | 10/2004 | Popovic | |
| 6,862,552 B2 | 3/2005 | Goldstein et al. | |
| 7,042,858 B1* | 5/2006 | Ma et al. | 370/331 |
| 7,072,295 B1 | 7/2006 | Benson et al. | |
| 7,095,812 B2* | 8/2006 | Chan et al. | 375/341 |
| 7,308,047 B2 | 12/2007 | Sadowsky | |
| 7,436,895 B1 | 10/2008 | Tujkovic | |
| 7,441,045 B2 | 10/2008 | Skene et al. | |
| 7,564,915 B2 | 7/2009 | Lee et al. | |
| 7,620,117 B2* | 11/2009 | Chae et al. | 375/299 |
| 7,688,902 B1* | 3/2010 | Lou et al. | 375/260 |
| 2002/0114404 A1 | 8/2002 | Aizawa et al. | |
| 2002/0176431 A1 | 11/2002 | Golla et al. | |
| 2003/0236080 A1 | 12/2003 | Tamer et al. | |
| 2004/0022179 A1 | 2/2004 | Giannakis et al. | |
| 2004/0116146 A1 | 6/2004 | Sadowsky et al. | |
| 2004/0165675 A1 | 8/2004 | Ito et al. | |

(Continued)

FOREIGN PATENT DOCUMENTS

EP    1162750 A2    12/2001

(Continued)

OTHER PUBLICATIONS

Horn, R.A., and C.R. Johnson, *Matrix Analysis*, Cambridge University Press, New York, 1994.

(Continued)

*Primary Examiner* — David C. Payne
*Assistant Examiner* — Leon-Viet Nguyen
(74) *Attorney, Agent, or Firm* — Blakely, Sokoloff, Taylor & Zafman LLP

(57) ABSTRACT

A method, apparatus and system are disclosed herein for wireless transmission from multiple non-collocated base stations. In one embodiment, the system comprises one or more terminals; and at least two base stations wirelessly communicating information-bearing signals from a set of antenna elements dispersed over multiple, non-collocated base stations to the one or more terminals using coding systems.

20 Claims, 8 Drawing Sheets

U.S. PATENT DOCUMENTS

| | | |
|---|---|---|
| 2004/0205445 A1 | 10/2004 | Xu |
| 2005/0010675 A1 | 1/2005 | Jaggi et al. |
| 2005/0047514 A1 | 3/2005 | Bolinth et al. |
| 2005/0068918 A1 | 3/2005 | Mantravadi et al. |
| 2005/0111592 A1 | 5/2005 | Yee |
| 2005/0185707 A1 | 8/2005 | Hoo et al. |
| 2005/0265280 A1 | 12/2005 | Roh et al. |
| 2006/0002312 A1 | 1/2006 | Delattre et al. |
| 2006/0020560 A1 | 1/2006 | Rodriguez et al. |
| 2006/0029124 A1 | 2/2006 | Grant et al. |
| 2006/0098760 A1 | 5/2006 | Shen et al. |
| 2006/0146716 A1 | 7/2006 | Lun et al. |
| 2006/0146791 A1 | 7/2006 | Deb et al. |
| 2006/0148506 A1 | 7/2006 | Hoo |
| 2006/0152391 A1 | 7/2006 | Effros et al. |
| 2006/0176945 A1 | 8/2006 | Li |
| 2007/0041475 A1 | 2/2007 | Koshy et al. |
| 2007/0066229 A1 | 3/2007 | Zhang et al. |
| 2007/0198899 A1 | 8/2007 | Yellin et al. |
| 2007/0281633 A1 | 12/2007 | Papadopoulos |
| 2007/0286313 A1 | 12/2007 | Nikopour-Deilami et al. |
| 2008/0025430 A1 | 1/2008 | Sadowsky |
| 2008/0075022 A1 | 3/2008 | Lei et al. |
| 2008/0123781 A1 | 5/2008 | Pisek et al. |
| 2008/0181339 A1 | 7/2008 | Chen et al. |
| 2009/0225878 A1 | 9/2009 | Papadopoulos et al. |

FOREIGN PATENT DOCUMENTS

| | | |
|---|---|---|
| EP | 1383246 A2 | 1/2004 |
| EP | 1411693 A2 | 4/2004 |
| EP | 1521386 A2 | 4/2005 |
| EP | 1530387 A1 | 5/2005 |
| EP | 1648097 A | 4/2006 |
| EP | 1648097 A2 | 4/2006 |
| EP | 1827040 A1 | 8/2007 |
| EP | 1863208 A1 | 12/2007 |
| GB | 2304495 | 3/1997 |
| GB | 2407007 A | 4/2005 |
| KR | 1020060063478 A | 6/2006 |
| WO | WO 01/43293 A1 | 6/2001 |
| WO | WO 2004/004567 A | 5/2004 |
| WO | WO 2004/025011 A | 7/2004 |
| WO | WO 2004/056011 A1 | 7/2004 |
| WO | WO 2005/046081 A1 | 5/2005 |
| WO | WO 2006/029050 A | 3/2006 |
| WO | WO 2007/050860 A1 | 5/2007 |
| WO | WO 2007/073267 A1 | 6/2007 |
| WO | WO 2007/087540 A2 | 8/2007 |
| WO | WO 2007/129990 A1 | 11/2007 |
| WO | WO 2008/057791 A1 | 5/2008 |
| WO | WO 2008/143973 A1 | 11/2008 |
| WO | WO 2009/033023 A2 | 3/2009 |
| WO | WO 2010/019618 A2 | 2/2010 |

OTHER PUBLICATIONS

Jafarkani, H., *Space-Time Coding, Theory and Practice*, chps. 1, 2, 3, 10, and 11, Cambridge University Press, 2005.

Alamouti, S. M., "A simple transmitter diversity scheme for wireless communications," *IEEE Journal Selected Areas in Communications*, pp. 1451-1458, Oct. 1998.

Tse, D. and Viswanath, P., "*Fundamentals of Wireless Communication*," Cambridge University Press, May 2005.

Stott, J. H., J. H., 1996, "The DVB terrestrial (DBV-T) specification and its implementation in a practical modem," *Proceedings of the 1996 International Broadcasting Convention, IEE Conference Publication No. 428*, pp. 255-260, Sep. 1996.

Lee, I., A.M. Chan, and C.-E. W. Sundberg, "Space-time bit-interleaved coded modulation for OFDM systems," *IEEE Transactions on Signal Processing*, pp. 820-825, Mar. 2004.

Lee, H., B. Lee, I. Lee, and C.-E. W. Sundberg, "A flexible space-time coding system with unequal error protection," *Proceedings of Vehicular Technology Conference (VTC 2005)*, Stockholm, Sweden, May 2005.

Cox, R.V., J. Hagenauer, N. Seshadri, and C.-E.W. Sundberg, "Sub-band speech coding and matched convolutional channel coding for mobile radio channels," *IEEE Transactions on Signal Processing*, pp. 17101731, Aug. 1991.

Taddei, H., S.A. Ramprashad, C.-E. W. Sundberg, and H.-L. Lou, "Mode adaptive unequal error protection for transform predictive speech and audio coders," *Proceedings of the IEEE International Conference in Acoustics, Speech, and Signal Processing (ICASSP 2002)*, vol. I, pp. 865-868, May 2002.

Hagenauer, J., Seshadri, N., and C.-E. W. Sundberg, "The performance of rate-compatible punctured convolutional codes for digital mobile radio," *IEEE Transactions on Communications*, pp. 969-980, Jul. 1990.

Chindapol, A., and J. A. Ritcey, "Design, analysis, and performance evaluation for BICM-ID with square QAM constellation in Rayleigh fading channels," *IEEE Journal on Selected Areas in Communications*, pp. 944-957, May 2001.

Li, X., A. Chindapol, and J. A. Ritcey, "Bit-interleaved coded modulation with iterative decoding and 8PSK signaling," *IEEE Transactions on Communications*, pp. 1250-1257, Aug. 2002.

Lee, B. I., and C.-E. W. Sundberg, "Code construction for space-time bit-interleaved coded modulation systems," *Proceedings of the IEEE International Conference on Communications (ICC '04)*, pp. 722-726, Jun. 2004.

Lee, I., and C.-E. W. Sundberg, "Reduced Complexity received structures for Space-Time Bit-Interleaved Coded Modulation Systems," to appear in *IEEE Transactions on Communications*.

PCT International Search Report dated Sep. 18, 2008, for PCT/US08/006286, filed May 16, 2008, 4 pages.

Written Opinion of the International Searching Authority dated Sep. 18, 2008, for PCT/US08/006286, filed May 16, 2008, 8 pages.

International Search Report mailed Nov. 6, 2008 for PCT/US08/065675, filed Jun. 3, 2008, 5 pages.

Written Opinion of the International Searching Authority mailed Nov. 6, 2008 for PCT/US08/065675, filed Jun. 3, 2008, 8 pages.

International Search Report for related application WO 08/048651, dated Jun. 25, 2008.

Written Opinion of the International Searching Authority for related application WO 08/048651, dated Jun. 25, 2008.

Communication Relating to the Results of the Partial International Search dated Jan. 31, 2009 for PCT/US07/13074, filed Jun. 1, 2007.

PCT International Search Report dated Apr. 14, 2008 for PCT/US07/23207, 3 pages.

Written Opinion of the International Searching Authority dated Apr. 14, 2008 for PCT/US07/23207, 6 pages.

PCT International Search Report dated Aug. 20, 2008 for PCT/US08/03274, 4 pages.

Written Opinion of the International Searching Authority dated Aug. 20, 2008 for PCT/US08/03274, 10 pages.

Lattice Semiconductor Corp., "Turbo Decoder", IP Data Sheet, 2003, 6 pages.

Kao, Chien-Yu, "A Bi-directional SOVA with Normalization for Turbo Decoding", Jun. 2006, Tainan, Taiwan, 72 pages.

Lee, Inkyu, et al., "Code Design of Space-Time Bit-Interleaved Coded Modulation Systems for Maximum Diversity", ICC, Jun. 2004, 11 pages.

Higuchi, K., et al., "Adaptive Selection of Surviving Symbol Replica Candidates ased on Maximum Reliability in QRM_MLD for OFCDM MIMO Multiplexing", in Proc. Globecom, Dec. 2004, pp. 2480-2486.

Wong, K., "The Soft-Output M-Algorithm and Its Applications", PhD Thesis, Queens University, Kingston, Canada, Aug. 2006, 263 pages.

Noh, Y., et al., "Design of Unequal Error Protection for MIMO-OFDM Systems with Heirarchical Signal Constellations", Journal of Communications and Networks, vol. 9, No. 2, Jun. 2007, pp. 167-176.

Seshadri, N., et al., "List Viterbi Decoding Algorithms with Applications", IEEE Transactions on Communications, vol. 42, No. 2/3/4, Feb./Mar./Apr. 1994, pp. 313-323.

Taoka, H., et al., "Field Experiments on Ultimate Frequency Efficiency Exceeding 30 Bit/Second/Hz Using MLD Signal Direction in MIMO-OFDM Broadband Packet Radio Access", Proceedings of IEEE Conference on Vehicular Technology, Apr. 2007, pp. 2129-2134.

Kawai, H., et al., "Independent adaptive control of surviving symbol replica candidates at each stage based on minimum branch metric in QRM-MLD for OFCDM MIMO multiplexing", IEEE Vehicular Techonology Conference, VTC2004, vol. 3, Sep. 2004, pp. 1558-1564.

Wong, K.K.Y., et al., "Low-complexity space-time turbo equalizer with the soft-output M-algorithm for frequency-selective channels", IEEE International Conference on Communications, vol. 4, May 2005, pp. 2251-2255.

Wong, K.K.Y., et al., "Bi-directional soft-output m-algorithm for iterative decoding", IEEE International Conference on Communications, vol. 2, Jun. 2004, pp. 792-797.

Kitty, K.Y. Wong, et al., "Soft-Output Trellis/Tree Iterative Decoder for high-order BICM on MIMO Frequency Selective Rayleigh Fading Channels", IEEE International Conference on Communications, Jun. 2006, pp. 4278-4284.

Papadopoulos, H., et al., "Wideband space-time coded systems with non-collocated antennas", Radio and Wireless Symposium, 2008 IEEE, Jan. 22, 2008, pp. 307-310.

Lee, Inkyu, et al., "Diversity Analysis for Space-Time, Bit-Interleaved Coded Modulation Systems", Korea University, Seoul, Korea, Jan. 2007.

Gencata, et al., "Virtual-topology adaptation for WDM mesh networks under dynamic traffic," Proceedings of IEEE Infocom 2002, vol. 1, Jun. 23, 2002, pp. 48-56.

Koetter, R., et al., "Beyond routing: an algebraic approach to network coding," Proceedings of IEEE Infocom 2002, vol. 1, Jun. 23, 2002, pp. 122-130.

Del Re, Enrico, et al., "Next-Generation Mobile Satellite Networks," IEEE Communications Magazine, vol. 40, No. 9, Sep. 1, 2002, pp. 150-159.

Ernest, P.H.H., et al., "An efficient algorithm for virtual topology reconfiguration in WDM optical ring networks," Proceedings of 10th Conference on Computer Communications and Networks, Oct. 15, 2001, pp. 55-60.

Fasolo, E., "Network coding techniques," www.cs.virginia.edu/{yw5s/Network%20coding.ppt, Mar. 7, 2004, pp. 1-14.

Chou, P.A., et al., "Network Coding for the Internet and Wireless Networks", www.eecs.umich.edu/systems/ChouSeminar.ppt, Mar. 28, 2006, pp. 1-29.

Ahlswede, R., et al., "Network Information Flow", IEEE Transactions on Information Theory, IT-46(4), Jul. 2000, pp. 1204-1216.

Ho, T., et al., "The Benefits of Coding Over Routing in a Randomized Setting", in the Proceedings of the International Symposium on Information Theory (ISIT), Jun. 2003, pp. 1-6.

Katti, S., et al., "XORs in the Air: Practical Wireless Network Coding", in the Proceedings of the ACM Special Interest Group on Data Communication (SIGCOMM), Sep. 2006, 12 pages.

Koetter, R., et al., "An Algebraic Approach to Network Coding", IEEE/ACM Transactions on Networking, vol. 11, No. 5, Oct. 2003, pp. 782-795.

Li, S. R., et al., "Linear Network Coding", IEEE Transactions on Information Theory, IT-49(2), Feb. 2003, pp. 371-381.

Chou, P.A., et al., "Practical Network Coding", 51st Allerton Conference on Communication, Control and Computing, Oct. 2003, 10 pages.

Cormen, T.H., et al., "Introduction to Algorithms", 2nd Edition, MIT Press and McGraw-Hill, 2001, pp. 643-700.

Jafarkani, H., "Space-Time Coding, Theory and Practice", Cambridge University Press, 2005.

Yiu, S., et al., "Distributed Block Source Coding", IEEE GLOBECOM 2005 Proceedings, Nov. 2005.

Su, W., et al., "Signal Constellations for Quasi-Orthogonal Space-Time Block Codes with Full Diversity", IEEE Transactions on Information Theory, Oct. 2004, pp. 2231-2347.

Jafarkani, H., "A Quasi-Orthogonal Space-Time Block Code", IEEE Transactions on Communications, Jan. 2001, 4 pages.

Tirkkonen, O. et al.: "Minimal Non-Orthogonality Rate 1 Space-Time Block Code for 3+ Transmit Antennas," IEEE 6th Int. Symp. Spread Spectrum Tech. and Appl., pp. 429-432, Sep. 2000, 4 pages.

Sharma, N. et al.: "Improved Quasi-Orthogonal Codes Through Constellation Rotation," IEEE Trans. Communications, pp. 332-335, Mar. 2003, 3 pages.

Wang, H. et al.: "Upper Bounds of Rates of Space-Time Block Codes from Complex Orthogonal Designs," IEEE Trans. Information Theory, pp. 2788-2796, Oct. 2003, 9 pages.

El Gamal, H. et al., "Distributed Space-Time Filtering for Cooperative Wireless Networks", GLOBECOM'03, Dec. 2003, pp. 1826-1830.

Guerin, R., et al., "Quality-of-Service in Packet Networks: Basic Mechanisms and Directions", Invited Paper, Computer Networks, vol. 31, No. 3, Feb. 1999, pp. 1-16.

Zhang, H., "Service Disciplines for Guaranteed Performance Service in Packet-Switching Networks", in the Proceedings of the IEEE, vol. 83, No. 10, Oct. 1995, pp. 1-23.

Caire, G., et al., "Achievable Throughput of MIMO Downlink Beamforming and Limited Channel Information", Proceedings of IEEE PIMRC, Aug. 2007.

Medard, M., "The Effect upon Channel Capacity in Wireless Communication of Imperfect Knowledge of the Channel", IEEE Transactions on Information Theory, May 2000, pp. 935-945.

Marzetta, T.L., "How Much Training Is Required for Multi-User MIMO?", ACSSC96, Asilomar Conference Oct. 2006.

Wiswanath, P., et al., "Sum Capacity of the Multiple Antenna Gaussian Broadcast Channel and Uplink-Downlink Duality", IEEE Transactions on Information Theory, Aug. 2003, pp. 1912-1923.

Peel, C.B., et al., "A Vector Pertrubation Technique for Near-Capacity Multi Antenna Multi User Communication, Part I: Channel Inversion and Regularization", IEEE Transactions on Communications, Jan. 2005, pp. 195-202.

Joham, M., et al., "Linear Transmit Processing in MIMO Communications Systems", IEEE Transactions on Signal Processing, Aug. 2005, pp. 2700-2712.

International Search Report dated Apr. 17, 2009 for PCT/US2008/076252, 5 pages.

Written Opinion of the International Searching Authority dated Apr. 17, 2008 for PCT/US2008/076252, 9 pages.

Osseiran, A., The Winner II Air Interface: Refined Spatial-Temporal Processing Solutions, Online Citation <https://www.ist.-winner.org/WINNER2-Deliverables/D3.4.1.pdf>, Jan. 1, 2007, pp. 1-148.

Bandemer, B., et al., "Linear MMSE Multi-User MIMO Downlink Precoding for Users with Multiple Antennas", IEEE International Symposium on Personal, Indoor and Mobile Communications, Sep. 1, 2006, pp. 1-5.

Catt, "Non-codebook based pre-coding for E-UTRA TDD Downlink", 3rd Generation Partnership Project, Oct. 4, 2006, pp. 1-3.

Gomadam, K.S., et al., "Techniques for Multi-user MIMO with Two-way Training", IEEE International Conference on Communications, May 19, 2008, pp. 3360-3366.

Written Opinion of the International Searching Authority dated Apr. 30, 2009 for PCT/US2007/022189, 8 pages.

Michalke, Clemens, et al., "Linear MOMO Receivers vs. Tree Search Detection: A Performance Comparison Overview", IEEE Internatinal Symposium on Personal, Indoor and Mobile Radio Communications, Sep. 11, 2006, pp. 1-7.

Narayanan, K.R., et al., "Low Complexity Turbo Equalization with Binary Coding", IEEE International Conference on Communications, ICC '2000, New Orleans, pp. 1-5, vol. 1.

Hoeher, Peter, "Advances in Soft-Output Decoding", IEEE Global Telecommunications Conference, Nov.-Dec. 1993, pp. 793-797.

PCT International Search Report for PCT Patent Application No. PCT/US2009/035735, dated Jul. 13, 2009, 5 pages.

Written Opinion of the International Searching Authority for PCT Patent Application No. PCT/US2009/035735, dated Jul. 13, 2009, 8 pages.

PCT International Search Report PCT/US2007/024572 mailed Apr. 15, 2008 (4 pages).

PCT Written Opinion PCT/US2007/024572 mailed Apr. 15, 2008 (6 pages).

Sezgin, A. et al, "On EXIT-chart analysis of coherent and non-coherent space-time codes," *Smart Antennas, 2004,* ITG Workshop on Munich, Germany, Mar. 18-19, 2004, Piscataway, NJ, USA, IEEE, Mar. 18, 2004, pp. 49-56, XP010780078, ISBN: 0-7803-8327-3, figures 1,2 abstract p. 50.

US Final Office Action for U.S. Appl. No. 12/040,653, dated Jun. 15, 2010, 40 pages.

US Final Office Action for U.S. Appl. No. 11/644,638, dated Apr. 29, 2010, 22 pages.
Korean Office Action for corresponding Korean Patent Application No. 2008-7023249, dated May 27, 2010, 4 Pgs.
European Office Action for corresponding European Patent Application No. 07862325.3, dated Jul. 6, 2010, 6 pgs.
PCT International Search Report for PCT Patent Application No. PCT/US2009/053472, dated Jun. 14, 2010, 7 pgs.
Written Opinion of the International Searching Authority for PCT Patent Application No. PCT/US2009/053472, dated Jun. 14, 2010, 5 pgs.
US Office Action for U.S. Appl. No. 11/873,248, dated Mar. 31, 2010, 18 pages.
Korean Office Action for corresponding Korean Patent Application No. 2008-7025915, dated Feb. 9, 2010.
PCT International Preliminary Report on Patentability for PCT Patent Application No. PCT/US2008/076252, dated Apr. 1, 2010, 9 pages.
PCT International Preliminary Report on Patentability for PCT Patent Application No. PCT/US2008/073646, dated Mar. 4, 2010, 6 pages.
Su, W., et al., "Two Generalized Complex Orthogonal Space-Time Block Codes of Rates 7/11 and 3/5 for 5 and 6 Transmit Antennas", IEEE Transactions on Information Theory, Jan. 2003, vol. 49, No. 1, pp. 313-316.
US Office Action for U.S. Appl. No. 11/644,638, dated Sep. 22, 2009, 13 pages.
PCT International Preliminary Report on Patentability for PCT Patent Application No. PCT/US2007/013074, dated Dec. 30, 2009, 8 pages.
PCT International Search Report for PCT Patent Application No. PCT/US2008/006287, dated Oct. 2, 2008, 6 pgs.
Written Opinion of the International Searching Authority for PCT Patent Application No. PCT/US2008/006287, dated Oct. 2, 2008, 7 pgs.
PCT International Preliminary Report on Patentability for PCT Patent Application No. PCT/US2008/065675, dated Dec. 17, 2009, 8 pages.
PCT International Search Report for PCT Patent Application No. PCT/US2009/054937, dated Dec. 30, 2009, 7 pgs.
Written Opinion of the International Searching Authority for PCT Patent Application No. PCT/US2009/054937, dated Dec. 30, 2009, 7 pgs.
Robertson, Patrick, et al., "A Comparison of Optimal and Sub-Optimal MAP Decoding Algorithms Operating in the Log Domain", Proceedings of the International Conference on Communications, Jun. 18, 1995, pp. 1009-1013, vol. 2, IEEE, New York, USA.
PCT International Search Report for PCT Patent Application No. PCT/US2009/56865, dated Mar. 2, 2010, 7 pgs.
Written Opinion of the International Searching Authority for PCT Patent Application No. PCT/US2009/56865, dated Mar. 2, 2010, 12 pgs.
PCT International Search Report for PCT Patent Application No. PCT/US2009/034758, dated Feb. 4, 2010, 7 pgs.
Written Opinion of the International Searching Authority for PCT Patent Application No. PCT/US2009/034758, dated Feb. 4, 2010, 7 pgs.
Sun, Sumei, et al., "Pseudo-Inverse MMSE Based QRD-M Algorithm for MIMO OFDM", Jan. 1, 2006, pp. 1545-1549, vol. 3.
Dai, Yongmei, et al., "A Comparative Study of QRD-M Detection and Sphere Decoding for MIMI-OFDM Systems", 2005 IEEE 16th International Symposium on Personal, Indoor and Mobile Radio Communications, Jan. 1, 2005, pp. 186-190.
US Office Action for U.S. Appl. No. 12/040,653, dated Dec. 11, 2009, 33 pages.
PCT International Preliminary Report on Patentability for PCT Patent Application No. PCT/US2008/003274, dated Sep. 24, 2009, 10 pages.
PCT International Search Report for PCT Patent Application No. PCT/US2007/013074, dated Dec. 2, 2009, 8 pgs.
Written Opinion of the International Searching Authority for PCT Patent Application No. PCT/US2007/013074, dated Dec. 2, 2009, 8 pgs.

PCT International Search Report for PCT Patent Application No. PCT/US2009/046014, dated Nov. 27, 2009, 7 pgs.
Written Opinion of the International Searching Authority for PCT Patent Application No. PCT/US2009/046014, dated Nov. 27, 2009, 8 pgs.
Stiglmayr, Stephan, et al., "Adaptive Coding and Modulation in OFDM Systems using BICM and Rate-Compatible Punctured Codes", 7 pages.
G. J. Foschini, H. C. Huang, M. K. Karakayali, R. A. Valenzuela, and S. Venkatesan, "The value of coherent base station coordination," in Proceedings of the 39th Annual Conference on Information Sciences and Systems (CISS '05), The Johns Hopkins University, Baltimore, Md, USA, Mar. 2005.
Yiu, S., et al., "Distritbuted Space-Time Block Coding for Cooperative Networks With Multiple Antenna Nodes", Computational Advances in Multi-Sensor Adaptive Processing, Dec. 13, 2005, pp. 52-55.
Yiu, Simon, et al., "Optimization of Distributed Space-Time Filtering", IEEE 62nd Vehicular Technology Conference, Sep. 2005, pp. 1829-1833, Piscataway, New Jersey, USA.
Adachi, Koichi, et al., "Iterative Modified QRD-M Based on CRC Codes for OFDM MIMO Multiplexing", IEICE Transactions on Communications, Jun. 1, 2007, pp. 1433-1443, vol. E90B, No. 6, Tokyo, Japan.
Detert, Thorben, "An Efficient Fixed Complexity QRD-M Algorithm for MIMO-OFDM using Per-Survivor Slicing", IEEE 4th International Symposium on Wireless Communications Systems, Oct. 1, 2007, pp. 572-576, Piscataway, New Jersey, USA.
US Office Action for U.S. Appl. No. 11/644,638, dated Sep. 30, 2010, 24 pages.
Korean Office Action for corresponding Korean Patent Application No. 2008-7025123, dated Sep. 29, 2010, 3 Pgs.
PCT International Preliminary Report on Patentability for PCT Patent Application No. PCT/US2009/035735, dated Sep. 16, 2010, 8 pages.
European Office Action for corresponding European Patent Application No. 07861675.2, dated Jul. 26, 2010, 4 pgs.
US Office Action for U.S. Appl. No. 11/754,903, dated Sep. 20, 2010, 18 pages.
US Office Action for U.S. Appl. No. 12/209,110 dated Feb. 11, 2011, 20 pages.
US Office Action for U.S. Appl. No. 12/121,649, Apr. 19, 2011, 25 pgs.
US Office Action for U.S. Appl. No. 12/130,821, Feb. 22, 2011, 12 pgs.
US Office Action for U.S. Appl. No. 12/121,634, Mar. 1, 2011, 19 pgs.
US Office Action for U.S. Appl. No. 11/644,638, Apr. 15, 2011, 7 pgs.
European Office Action for European Patent Application No. 09718026.9, Feb. 10, 2011, 3 pgs.
European Office Action for European Patent Application No. 08756664.2, Mar. 17, 2011, 6 pgs.
US Final Office Action for U.S. Appl. No. 11/873,248, dated Sep. 1, 2010, 21 pages.
Sen, et al., "Cute and jCUTE Concolic Unit Testing and Explicit Path Model-Checking Tool", Computer Aided Verification Lecture Notes in Computer Science, Jan. 1, 2006, pp. 419-423.
Majumdar, et al., "Hybrid Concolic Testing", IEEE 29th International Conference on Software Engineering, May 1, 2007, pp. 416-426.
PCT International Preliminary Report on Patentability for PCT Patent Application No. PCT/US2009/046014, dated Dec. 16, 2010, 9 pages.
PCT International Search Report for PCT Patent Application No. PCT/US2010/033549, Jan. 5, 2011, 5 pgs.
PCT Written Opinion of the International Searching Authority for PCT Patent Application No. PCT/US2010/033549, Jan. 5, 2011, 6 pgs.
European Office Action for European Patent Application No. 08767750.6, dated Jan. 12, 2011, 6 pgs.
PCT International Search Report for PCT Patent Application No. PCT/US2010/027139, Dec. 6, 2010, 5 pgs.

PCT Written Opinion of the International Searching Authority for PCT Patent Application No. PCT/US2010/027139, Dec. 6, 2011, 6 pgs.

European Office Action for European Patent Application No. 08767751.4, Jan. 14, 2011, 5 pgs.

Papadogiannis, et al., "A Dynamic Clustering Approach in Wireless Networks with Multi-Cell Cooperative Processing", IEEE International Conference on Communications, May 19, 2008, pp. 4033-4037.

PCT International Preliminary Report on Patentability for PCT Patent Application No. PCT/US2009/053466, dated Feb. 24, 2011, 9 pages.

PCT International Preliminary Report on Patentability for PCT Patent Application No. PCT/US2009/053471, dated Feb. 24, 2011, 9 pages.

PCT International Preliminary Report on Patentability for PCT Patent Application No. PCT/US2009/054937, dated Mar. 10, 2011, 8 pages.

PCT International Preliminary Report on Patentability for PCT Patent Application No. PCT/US2009/056865, dated Mar. 24, 2011, 12 pgs.

European Office Action for European Patent Application No. 07862325.3, Apr. 7, 2011, 6 pgs.

* cited by examiner $$V = \begin{bmatrix} v_1 & 0 & 0 & 0 & \cdots & 0 \\ 0 & 0 & 0 & 0 & \cdot^{\cdot^{\cdot}} & v_N \\ \vdots & \vdots & \vdots & \cdot^{\cdot^{\cdot}} & \cdot^{\cdot^{\cdot}} & 0 \\ 0 & 0 & 0 & v_4 & \cdot^{\cdot^{\cdot}} & \vdots \\ 0 & 0 & v_3 & 0 & \cdots & 0 \\ 0 & v_2 & 0 & 0 & \cdots & 0 \end{bmatrix}$$

FIG. 5

$$\begin{array}{c} \text{1} \quad \text{2} \quad \leftarrow \text{Antenna \#} \\ \begin{array}{c} 1 \\ 2 \end{array} \quad B = \begin{bmatrix} x(1) & x(2) \\ x^*(2) & -x^*(1) \end{bmatrix} \end{array}$$

↑
Time Slots $$\begin{array}{c} \text{1} \quad\quad\quad\quad \text{2} \quad \leftarrow \text{Base Station \#} \\ \begin{array}{c} 1 - (L+N) \\ (L+N+1) - 2 \times (L+N) \end{array} \quad \underline{B} = \begin{bmatrix} G\Phi s(1) & G\Phi s(2) \\ GU^*\Phi^*s^*(2) & -GU^*\Phi^*s^*(1) \end{bmatrix} \end{array}$$

↑
Time Slots

FIG. 6

$$B = \begin{bmatrix} x(1) & x(2) & x(3) & 0 \\ -x^*(2) & x^*(1) & 0 & x(3) \\ x^*(3) & 0 & -x^*(1) & x(2) \\ 0 & x^*(3) & -x^*(2) & -x(1) \end{bmatrix} \begin{array}{l} \leftarrow \text{Antenna \#} \\ \\ \\ \\ \end{array}$$

with rows labeled 1, 2, 3, 4 (Time Slots) and columns 1, 2, 3, 4.

$$\underline{B} = \begin{bmatrix} G\Phi s(1) & G\Phi s(2) & G\Phi s(3) & 0 \\ -GU^*\Phi^*s^*(2) & -GU^*\Phi^*s^*(1) & 0 & G\Phi s(2) \\ GU^*\Phi^*s^*(3) & 0 & -GU^*\Phi^*s^*(1) & G\Phi s(3) \\ 0 & -GU^*\Phi^*s^*(3) & -GU^*\Phi^*s^*(2) & -G\Phi s(1) \end{bmatrix} \begin{array}{l} \leftarrow \text{Base Station} \end{array}$$

with rows labeled 1 - (L+N), (L+N+1) - 2×(L+N), 2×(L+N)+1 - 3×(L+N), 3×(L+N)+1 - 4×(L+N) (Time Slots) and columns 1, 2, 3, 4.

FIG. 9

METHOD AND APPARATUS FOR WIDEBAND TRANSMISSION FROM MULTIPLE NON-COLLOCATED BASE STATIONS OVER WIRELESS RADIO NETWORKS

PRIORITY

The present patent application claims priority to and incorporates by reference the corresponding provisional patent application Ser. No. 60/861,539, titled, "A Method and Apparatus for Efficient Wideband Transmission from Multiple Non-Collocated Base Stations Over Wireless Radio Networks," filed on Nov. 28, 2006.

FIELD OF THE INVENTION

The present invention relates to the field of wireless communication; more particularly, the present invention relates to wireless transmission from multiple non-collocated base stations in a wireless network.

BACKGROUND OF THE INVENTION

Future wireless systems require a more effective utilization of the radio frequency spectrum in order to increase the data rate achievable within a given transmission bandwidth. This can be accomplished by employing multiple transmit and receive antennas combined with signal processing. A number of recently developed techniques and emerging standards are based on employing multiple antennas at a base station to improve the reliability of data communication over wireless media without compromising the effective data rate of the wireless systems. So called space-time block-codes (STBCs) are used to this end. Specifically, recent advances in wireless communications have demonstrated that, by jointly encoding symbols over time using multiple transmit antennas at a base station, one can obtain reliability (diversity) benefits as well as increases in the effective data rate from the base station to each cellular user. These multiplexing (throughput) gain and diversity benefits depend on the space-time coding techniques employed at the base station. The multiplexing gains and diversity benefits are also inherently dependent on the number of transmit and receive antennas in the system being deployed, in the sense that they are fundamentally limited by the multiplexing-diversity trade-offs curves that are dictated by the number of transmit and the number of receive antennas in the system.

A complimentary way of increasing the effectiveness/quality of transmission in the case of delivery of media, such as voice, audio, image and video, is to employ unequal error protection (UEP) methods, which are well-known in the art.

For high data rates and wideband transmission, the use of OFDM makes the equalizer unnecessary. With multilevel modems, coded modulation systems can easily be designed by use of an outer binary convolutional code and an interleaver in a so-called bit-interleaved coded modulation (BICM) system.

A large collection of STBCs have been proposed in recent years as a means of providing diversity and/or multiplexing benefits by exploiting multiple transmit antennas in the forward link of cellular systems. Given the presence of $N_t$ transmit antennas, the typical objective is to design STBCs that provide order-"$N_t$" transmit-antenna diversity in the system. Typical STBC designs transmit an antenna-specific block of t samples per antenna for each block of k information symbols. Such STBC designs are described by a STBC matrix with t rows and n columns, whereby the (i, j)th entry denotes the sample transmitted by the antenna j at time i. Of interest is the symbol rate of the STBC scheme, R, which is equal to k/t (i.e., the ratio of k over t). Full rate STBCs are STBCs whose rate R equals 1 symbol per channel use. Another important attribute of a STBC is its decoding complexity. Although, the decoding complexity of the optimal decoder for arbitrary STBCs is exponential in the number k of jointly encoded symbols, there exist designs with much lower complexity. One such attractive class of designs, referred to as orthogonal space-time codes (OSTBCs), can provide full diversity while their optimal decoding decouples to (linear processing followed by) symbol-by-symbol decoding. Full rate OSTBCs exist only for a two transmit-antenna system. For three or more antennas the rate cannot exceed ¾ symbols/per channel use. This rate is achievable for $N_t$=3 and $N_t$=4 antennas. For more than four antennas the highest-rate OSTBCs are not known in general. In general, a rate equal to ½ symbols/channel use is always achievable, but, often, higher rates may also attainable for specific values of n.

A number of systems deployed for broadcasting common audio/video information from several base stations are exploiting coded OFDM transmission under the umbrella of the single frequency network concept. These systems employ a common coded OFDM-based transmission from each of the broadcasting base-stations. The OFDM based transmission allows asynchronous reception of the multitude of signals and provides increased coverage. However, as all base-stations transmit the same coded version of the information-bearing signal, single frequency network (SFN) systems do not provide in general full transmit base-station diversity with full coding gains (some form of this diversity is available in the form of multi-path diversity, although limited since it is not coordinated).

Another class of schemes are space-time bit-interleaved coded modulation (BICM) systems with OFDM and can provide spatial (transmit and receive antenna) diversity, frequency diversity and can cope with asynchronous transmission. Furthermore, by modifying the binary convolutional code to a rate compatible punctured convolutional code, a flexible UEP system can be achieved. For some systems, it is assumed that all transmit antennas are collocated at one and the same base station.

One drawback associated with the aforementioned BICM OFDM systems is that the near-optimum receiver can be quite complex (computation intensive). The necessary joint demapper unit (inner MAP decoder) grows in complexity exponentially with the product of the number of transmit antennas and the number of bits per modem constellation point. As an example with 16 QAM (4 bits/symbol) and transmit antennas, the complexity of the calculations in the inner decoder is proportional to $2^{4 \times 4}=2^{16}$ per block of 16 bits. There exist methods that can be used for reducing the decoder complexity without substantial loss in performance.

There exists a class of low complexity designs for narrowband transmission from multiple base stations to one or more receivers. These designs provide full transmit base-station diversity with very low decoding complexity even in the case of asynchronous reception. Although these designs can, in principle, also be employed for wideband transmission, and in fact some of these designs (the OFDM-type ones) still provide all the aforementioned benefits, they do not harvest any of the available frequency diversity available within the transmission bandwidth.

SUMMARY OF THE INVENTION

A method, apparatus and system are disclosed herein for wireless transmission from multiple non-collocated base stations. In one embodiment, the system comprises one or more terminals; and at least two base stations wirelessly communicating information-bearing signals from a set of antenna elements dispersed over multiple, non-collocated base stations to the one or more terminals using coding systems.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5 illustrates a structure of a matrix V shown in Table 1.

FIG. 6 illustrates an example of code construction for use with a two-transmit base station system with a single transmit antenna per base-station using an Alamouti code as the baseline code.

FIG. 9 illustrates an example of code construction for a four transmit base-station system in which each base station employs a single transmit antenna.

DETAILED DESCRIPTION OF THE PRESENT INVENTION

Figure 1:
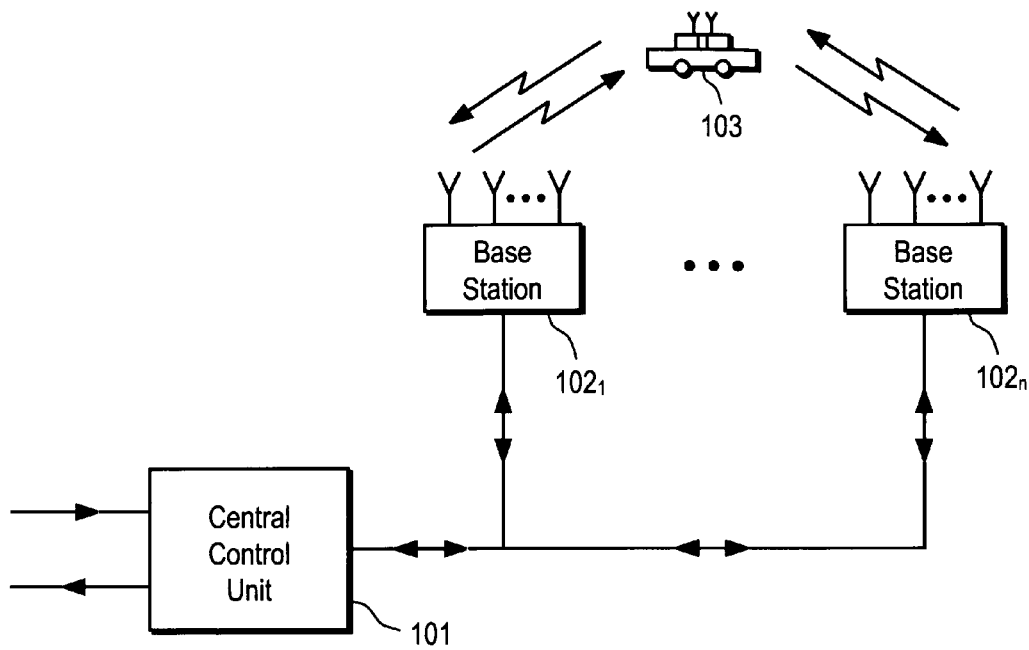
FIG. 1 illustrates wireless wideband transmission from multiple base stations to mobile receivers.

One embodiment of the present invention relates, in general, to signal design and to managing sending/receiving information over wireless systems, with multiple transmit antennas and, potentially, multiple receive antennas. In one embodiment, a mobile receives a signal (by use of one or several antennas) that is sent over multiple transmit antennas, and the transmit antennas are distributed over multiple base stations (i.e., they are not collocated). In one embodiment, wideband transmission is achieved by using an outer binary convolutional code, bit-interleaved coded modulation, and an inner space-time block code that performs OFDM-type transmission. Optionally, flexible unequal error protection for media signals is used in conjunction with these embodiments by using a rate-compatible punctured convolutional code as the outer code.

When combined with signal processing, multiple transmit and receive antennas can yield communication links with increased bandwidth efficiency (data rate), extended power efficiency (range), or both. Embodiments of the present invention are directed to the forward link, i.e., the base station-to-mobile transmission direction of transmission. Methods and apparatuses are disclosed for reliably transmitting an information-bearing stream of symbols from multiple base stations to one or more designated mobile receivers, where the desired objective of reliable transmission is obtained by space-time coding the information-bearing signal across all transmitting base stations (via a set of transmit antennas that are non-collocated).

In one embodiment, wideband (high data rate) transmission over frequency selective fading channels is used. In one embodiment, the space-time codes are robust and flexible to changes in the number of transmit and receive antennas as well as the modem constellations. They also allow reliable data decoding at any mobile, even in the case that the signals transmitted by distinct base stations are received at the mobile asynchronously, i.e., relatively delayed with respect to one another. Compared to other existing schemes, proposed schemes allow for lower complexity receivers at the price of reduced symbol-rate. Also, in one embodiment, the techniques described herein provide flexible unequal error protection.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

One proposed method focuses on the use of space-time coding and decoding algorithms for asynchronous wideband transmission over frequency selective wireless channels. In accordance with one embodiment, a class of space-time block codes operates in a system with $N_t$ transmit antennas distributed over multiple base stations. One advantage of the proposed methods is that they provide high-reliability information delivery at acceptable decoding complexity. Specifically, advantages of the disclosed techniques include the following: 1) provide full "transmit base-station" diversity, for any set of relative delays between transmitting base stations, provided that none of the relative delays of arrival exceed the maximum allowable value (design parameter); 2) allow harvesting frequency diversity by means of the bit-interleaved coded modulation outer code; 3) do not require that the transmitting base-stations know the relative delays of arrivals of signals transmitted by different base stations; 4) complexity of the near-optimal receiver associated with these schemes does not grow with the number of total transmit antennas (over all base stations) used in the transmission, unlike other existing designs (where receiver complexity grows exponentially with the number of transmit antennas employed by the system); 5) iterative decoding yields improved performance at acceptable decoding complexity and provides improvements in performance, even in the case of communication over flat (frequency nonselective) fading wireless channels.

Embodiments of the invention exploit intelligent wideband transmission of the information bearing signal over the multiple independently fading paths from each transmitting base station to a receiver in such a way that it provides full transmit base station diversity, the frequency diversity available in the transmission bandwidth, receive antenna diversity if multiple receive antennas are employed, and extended coverage. In one embodiment, the information bearing signal is available at multiple base stations, and a single active base station with multiple transmit antennas is used. In particular, space-time block codes (STBCs) are used to provide diversity in the forward link, in the case that a single base station with multiple transmit antennas is employed for transmission by using an OFDM-based BICM system.

A proposed method possesses distinct connections to as well as differences from the other existing space-time coding designs. The connections are evident when one views each of the "active" base stations as an element in a virtual transmit antenna array, and suggest exploiting standard space-time coding techniques for providing diversity in these settings by treating each active base station antenna as a transmit antenna. However, unlike the setting involving a single base station with multiple transmit antennas where the data is available at a single base station and can be encoded in a coordinated fashion over space and time to provide reliable transmission, in the setting of interest each active base station must encode its data independently. One important consequence of this is that, in general, there can be a lack of time-synchronization between the transmissions from different base stations to the receiver. This asynchrony can arise due to the fact that the individual base stations may be operating independently, but also due to the fact that even if the signals the signals transmitted from spatially dispersed base stations to a receiver are transmitted synchronously, they may arrive asynchronously at the receiver. Furthermore, in the context of wideband transmission, the system allows low complexity receiver designs that can harvest not only the available transmit antenna diversity but also the available frequency diversity.

Systematic construction of space-time coding techniques for generating wideband signals for transmission from distinct base stations is described, as well as methods for data decoding at the receiver when these transmissions are received with relative delay offsets. In one embodiment, the underlying basis of the transmission consists of exploiting an outer-inner code construction in which the inner code harvests in full the available transmit base station diversity while the outer code harvest the available frequency diversity. This technique has the following features:

1. By use of the specially designed inner OFDM-based orthogonal space-time block code, the method provides full transmit base-station antenna diversity, subject to a maximum allowable relative delay offset between transmissions from multiple base stations.
2. By use of the outer convolutional code with bit-interleaved coded modulation, the method provides the frequency diversity available over the bandwidth of the wideband transmission.
3. A method is provided for low-complexity decoding that consists of linear front-end for the orthogonal space-time block code, followed by a potentially iterative MAP decoder for the outer code. Unlike other existing schemes for which the near-optimum decoder complexity is exponential in the number of transmit antennas, the growth in complexity of the near-optimal decoder for the proposed scheme is negligible in the number of antennas.

The techniques described herein include the use of a class of space-time coding and associated transceivers for enabling reliable transmission of common information from a set of base stations to one or more receivers over wideband wireless channels. The setting of interest for the proposed embodiments is depicted in FIG. 1, which is described below. Embodiments of the invention are focused on the forward link (FL, base-to-mobile). For the purpose of extending coverage and providing additional diversity or opportunistic data rate increases, the signal is transmitted over a number of transmit antennas distributed over multiple base stations. In one embodiment, transceivers achieve reliable transmission of a common information signal by sending distinct encodings from each antenna at each base station without the need for synchronizing the transmissions. A proposed method results in reduced decoding-complexity schemes that provide full "transmit base-station" diversity, frequency diversity, and receiver antenna diversity (if multiple receive antennas are employed) for arbitrary sets of relative delays in the reception of the signals transmitted from different base stations, and provided that the maximum relative delay between transmissions does not exceed an a priori determined value.

An Example of a Two-Based Station Embodiment

Embodiments of the invention include transceivers for asynchronous reliable wideband wireless communication of a symbol stream from $N_t$ transmitting antennas distributed over multiple base stations to one or more receivers.

FIG. 1 illustrates an asynchronous wireless wideband transmission from multiple base stations to mobile receivers (terminals). Referring to FIG. 1, multiple base stations $102_{1-n}$ are shown, and each of these base stations has, potentially, multiple antennas for communicating with mobile receivers, such as mobile receiver 103. Each transmitting base station of base stations $102_{1-n}$ has available the same information-bearing symbol stream that is to be communicated to the receiver(s) 103.

In one embodiment, communication between the base stations and mobile receivers occurs using transmission techniques that employ the following building blocks:

1. an outer code, e.g., consisting of an binary code, such as a rate-compatible convolutional code, together with a bit-interleaver, a mapper, and a modem, yielding bit-interleaved coded modulation; and
2. an inner orthogonal space-time block code (non-binary) based on OFDM-type transmission, designed to be robust to the asynchronous nature of the received signals from non-collocated antennas, while providing the available full transmit base-station diversity in the transmission.

Central control unit 101 is communicably coupled to base stations $102_{1-n}$ to control base stations $102_{1-n}$. In one embodiment, control unit 101 manages the information flow (signals) to and from the involved base stations/transmit antennas as well as channel identification algorithms. Control unit 101 selects the transmit antennas and base stations from a collection of available base stations. In one embodiment, control unit 101 communicates with the (transmitting) base stations $102_{1-n}$ via wire (or wireless broadcast). It should be noted that the signals transmitted from any two antennas (whether the antennas reside on the same or on different base stations) are typically not the same, just as is the case with existing space time code designs for systems with collocated transmit antennas.

An Example of a Transmitter

Figure 2:
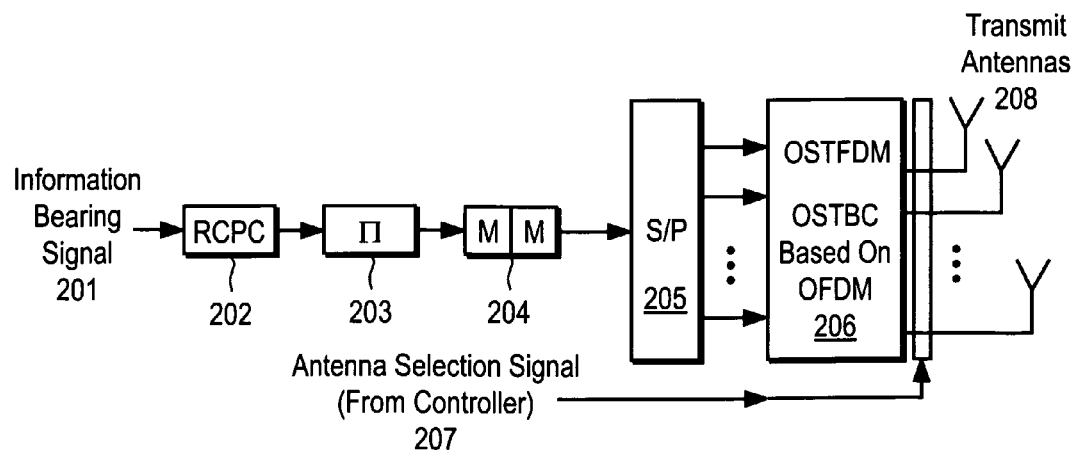
FIG. 2 is a block diagram of one embodiment of an encoder for encoding of information-bearing signal at one of the transmitting base stations.

FIG. 2 is a block diagram of one embodiment of an encoder for encoding of information-bearing signal at one of the transmitting base stations. In one embodiment, such an encoder is used for encoding and transmission at a base station.

Referring to FIG. 2, the information-bearing signal 201 is first encoded by a binary code. The binary code may be, for example, a block code, an LDPC code, a convolutional code, or a turbo code. For illustration, in FIG. 2, the information bearing signal is first encoded by a rate-compatible punctured convolutional code (RCPC) 202, followed by a bit interleaver 203, followed by a mapper/modulator unit 204. The output of mapper/modulator 204 is then converted into vector parallel streams by serial-to-parallel (S/P) converter 205 that are encoded according to the OFDM-based orthogonal space-time block code system 206. The output streams from OSTFDM 206 are then passed through a controller 204 that selects which output stream of the inner space-time block code is transmitted over any one of transmit antennas 208.

The outer code and the interleaver in the BICM scheme provide additional robustness (to that provided by the OSTBC) in the transmission, yielding reliable, high data-rate, wideband transmission over frequency selective channels.

Shown in the figure is also the UEP feature available to the transmission scheme by means of the RCPC encoder. The equal error protection (EEP) case is of course, a special case. Note that, throughout these figures and accompanying text, $N_t$ and $N_r$ denote the number of transmit and receive antennas, respectively, while N denotes the number of OFDM frequency components.

An orthogonal space-time block code (OSTBC) is employed after the BICM scheme. In one embodiment, the OFDM-based OSTBC is described in U.S. Provisional Patent Application No. 60/857,265, entitled "A Method and Apparatus for Asynchronous Space-Time Coded Transmission from Multiple Base Stations over Wireless Radio Networks," filed Nov. 8, 2006 and is referred to as an orthogonal space-time frequency division multiplexing (and labeled OSTFDM). By employing such a code, the receiver complexity is significantly reduced as discussed below. In particular, the decoding complexity of the near-optimal receiver grows insignificantly with the use of additional transmit antennas.

In one embodiment, the OSTBC handles signals received from different transmitter antennas which are arriving at the receiver asynchronously. The reason for this is that it is assumed that the transmitter antennas are distributed over multiple base stations (i.e., they are not collocated). With an OFDM based orthogonal STBC, the receiver is robust to time delays between signals from different transmitter antennas.

The inner code employed in the encoder/transmitter shown in FIG. 2 is referred to herein as an orthogonal space-time frequency division multiplexing (OSTFDM) code. In one embodiment, the OSTFDM code is an OFDM-type OSTBC constructed according to method described in U.S. Provisional Patent Application No. 60/857,265, entitled "A Method and Apparatus for Asynchronous Space-Time Coded Transmission from Multiple Base Stations over Wireless Radio Networks," filed Nov. 8, 2006. Specifically, the $N_t$ transmit-antenna OSTFDM (referred to as induced code) is generated via systematic transformations of a conventional $N_t$ transmit transmit-antenna orthogonal space-time block code, referred to herein as the "baseline" code. The baseline OSTBC is a k-by-t-by-$N_t$ code, i.e., it is an OSTBC that encodes k information symbols at a time into a block of t time slots, over $N_t$ (collocated) antennas. Letting x(1), x(2), ..., x(k), denote a typical block of k scalar, complex-valued information-bearing symbols that are inputs to the baseline OSTBC, the baseline encoder generates a code that is represented by a matrix B of dimensions t by $N_t$, whereby the (j,i)th element of B denotes the sample that is to be transmitted by the antenna i at time j, in the context of an n transmit-antenna system utilizing the baseline code.

Given such a baseline code, a maximum allowable relative delay in the signals received from multiple base stations, and a number of OFDM bands N, a K-by-T-by-$N_t$ induced OSTBC is generated, which encodes K information symbols at a time over a block of T time slots, and over n single-antenna transmit base-stations. In one embodiment, the values of the integers K and T are determined as follows. The integer K equals N times k, signifying that, for each scalar symbol encoded by the baseline code, the induced code encodes a vector of N symbols. The induced code encodes K symbols at a time into blocks of T samples/per transmit base-station, where T equals t(N+L) (i.e., t times the sum of N and L), and where L is chosen so as to satisfy the maximum allowable relative delay constraint.

An Example of a Receiver

In one embodiment, the receiver used at the mobile receiver comprises a linear front-end for the orthogonal non-binary space-time block code resulting in symbol-by-symbol modem demapper decisions, a deinterleaver and a maximum a posteriori probability decoder for the outer convolutional code. In one embodiment, iterative decoding is performed by using the demapper as the inner MAP decoder. Non-iterative receivers that are based on the Viterbi algorithm correspond to reduced-complexity options and may also be used.

Figure 3:
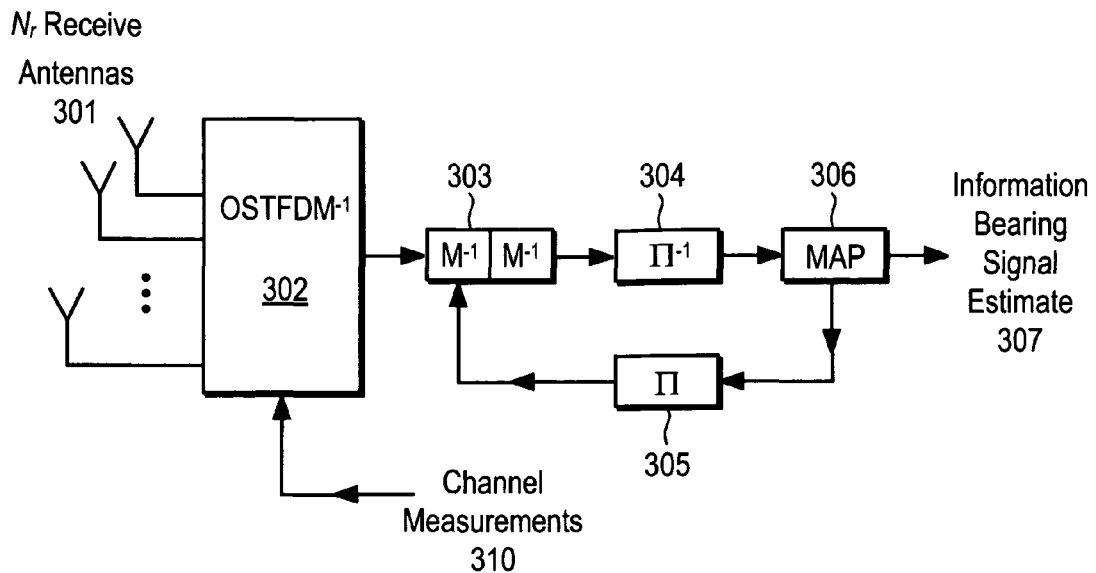
FIG. 3 is a block diagram of one embodiment of a receiver structure at a mobile receiver for use with the encoder of FIG. 2.

FIG. 3 is a block diagram of one embodiment of a receiver structure at a mobile receiver for use with the encoder of FIG. 2. The receiver comprises a linear front end for the inner code, followed by a decoder for the outer code system. After demodulation, carrier/timing recovery and baud-rate sampling, a linear receiver front-end 302 is employed by exploiting channel estimates and relative delay of arrival estimates for each transmit-antenna to receive-antenna channel. The output of the linear front end 302 is a single baud-rate sequence that is demodulated demapped and deinterleaved demodulator/demapper unit 303, the output of demodulator/demapper 303 is input to bit deinterleaver 304. Bit deinterleaver 304 performs bit deinterleaving. The output of bit deinterleaver 304 are sent to the Maximum a Posteriori (MAP) decoder 306, which obtains an estimate of the information-bearing signal 307. New MAP estimates are obtained iteratively by using as inputs to the demapper re-interleaved versions of the current MAP estimates created by bit interleaver 305, which are sent to demodulator/demapper 303.

OSTBC-based Encoding

Figure 4:
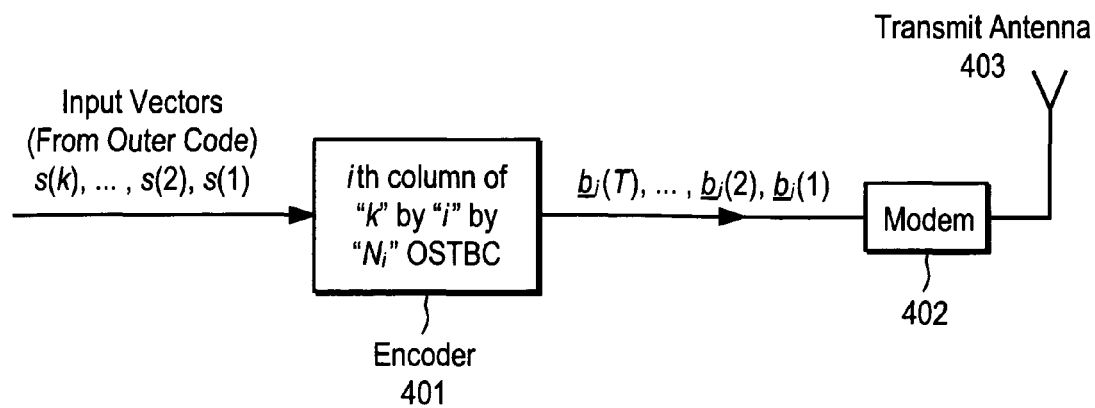
FIG. 4 illustrates OSTBC-based encoding at one antenna at one embodiment of a base station.

FIG. 4 illustrates OSTBC-based encoding at one antenna in one embodiment of a base station. It is assumed that the given antenna's index in the enumeration of all transmitting antennas over all transmitting base stations equals i, where i is an integer between 1 and $N_t$. That is, i is the index of the given antenna in enumeration of all transmit antennas over all base stations.

Referring to FIG. 4, s(1), s(2), . . . , s(k) denote a typical block of k information-bearing symbol input vectors of dimension N that are inputs to the induced OSTBC according to one embodiment of the present invention. The i-th vector s(i) is a vector (or block) of N scalar complex-valued, information-bearing symbols in the induced code (where N denotes the blocking factor in the construction). Given such a set of input vectors, induced encoder 401 generates an induced code that is represented by a matrix $\underline{B}$ with T rows and n columns, where T equals t times the sum of N and L. The output matrix $\underline{B}$ of induced code of dimension "T"×"n" may be represented as follows:

$$\underline{B} = \underline{B}(s(1), s(2), \ldots, s(k)) = [\underline{b}_1 \underline{b}_2 \ldots \underline{b}_n]$$

The (j,i)th element of $\underline{B}$ denotes the sample that is to be transmitted by the i-th base station at time j, in the context of an n transmit base-station system utilizing the induced code (where the output of an OFDM transmitter is expressed as a "single-carrier" type output whereby the symbol transmitted at time j is the symbol that will be modulated on the pulse-shaping waveform at time j.) Note that the combined effect of a block of consecutive N+L transmissions is an N-tone OFDM symbol with circular prefix of length L. Thus, the output vector of induced code (of dimension "T") associated with the ith transmit base station is as follows:

$$\underline{b}_i = \underline{b}_i(s(1), s(2), \ldots, s(k)) = [\underline{b}_i(1) \underline{b}_i(2) \ldots \underline{b}_i(T)]^T$$

More specifically, in response to information-bearing symbol vectors s(k), . . . , s(2), s(1), encoder 401 outputs $\underline{b}_i(T)$, . . . , $\underline{b}_i(2)$, $\underline{b}_i(1)$. The output of encoder 401 is received by modem 402, which causes the symbols to be transmitted via transmit antenna 403 at the ith base station.

In one embodiment, the induced orthogonal space-time block code $\underline{B}$ is generated by systematic transformations of the elements of the associated baseline code B. More specifically, in one embodiment, each entry of the baseline OSTBC equals one of the following: (i) the value zero; (ii) one of the k input symbols; (iii) one of the k input symbols negated; (iv) the complex conjugate of an input symbol; (v) the negative of the complex conjugate of an input symbol. Therefore, to generate the induced OSTBC, initially the mth vector input to $\underline{B}$, s(m), is paired with the mth scalar input to B (i.e., x(m)). Then $\underline{B}$ is generated from B by replacing each entry of B with a vector of dimension N+L according to the rules specified in Table 1 below:

TABLE 1

| Entry of Original OSTBC (scalar) | Associated Entry of induced OSTBC (vector) |
|---|---|
| x(m) | GΦs(m) |
| −x(m) | −GΦs(m) |
| x*(m) | GU*Φ*s*(m) |
| −x*(m) | −GU*Φ*s*(m) |
| 0 | 0 |

Table 1 above illustrates systematic construction of the induced OSTBC from a baseline OSTBC. In one embodiment, each information-bearing symbol x(m) in the baseline OSTBC matrix B is associated with a vector of information bearing symbols s(m), of dimension N, in the induced code $\underline{B}$. To construct the induced matrix $\underline{B}$, each scalar entry of the original OSTBC matrix B is replaced by a vector entry of dimension N+L, according to the table above. The matrix Φ is a DFT matrix with N rows and N columns. The matrix G has N+L rows and N columns. The transformation process takes as an input a vector of dimension N and produces a vector of dimension N+L, in which the last N entries of the output vector are the entries of the input vector (in the same order) and in which the L first entries of the output vector are the last L entries of the input vector (in the same order). The matrix U is of the form $U = \Phi^V \Phi^H$, where Φ is a DFT matrix of dimension N, and V is a matrix with N rows and N columns that has the form shown in FIG. 5. Finally, the superscripts "*" and "$^H$" denote element-wise conjugation and the Hermitian (conjugate transpose) operation, respectively. For more information on these operations, see R. A. Horn and C. R. Johnson, *Matrix Analysis*. New York: Cambridge Univ. Press, 1994.

As shown in Table 1, all vectors of dimension N+L that replace elements of B in order to generate $\underline{B}$ are generated via conjugation or linear operations. In one embodiment, the matrices Φ and U employed in these transformations are restricted to have a structure that guarantees that the resulting induced OSTBC has the desired properties. In one embodiment, matrix Φ is a (normalized) DFT matrix of N rows and N columns. The matrix U also has N rows and N columns and is also unitary, and it has the form $U = \Phi^V \Phi^H$, where V is a matrix with N rows and N columns that has the form shown in FIG. 5, and in which each $v_i$ is a complex number with magnitude equal to 1.

One embodiment of a method for constructing the induced OSTBC as per Table 1 is given below. Consider first the case that the (i,j)th entry of B (for some i and j) is equal to x(m) for some value of m. In this case, in one embodiment, this entry is replaced by a vector v(m), of dimension N+L generated by: 1) generating the intermediate vector z(m), of dimension N, by multiplying the vector s(m) with the matrix F; 2) adding an L-sample circular prefix to z(m) to produce a vector v(m) (i.e., generating a vector v(m) of dimension N+L where the first L entries of v(m) are the last L entries of z(m) and the last N entries of v(m) are the entries of z(m) (in the same order)); and 3) replacing the (i,j)th entry of B (equal to x(m) by assumption) with v(m).

Next, consider the case that the (i,j)th entry of B (for some i and j) is equal to the conjugate of x(m) for some value of m. In this case, in one embodiment, this entry is replaced by a vector u(m), of dimension N+L generated by: 1) generating an intermediate vector z(m), of dimension N, by multiplying the element-wise complex conjugate of the vector s(m) with the matrix F*, which is the element-wise complex conjugate of the matrix F; 2) generating an intermediate vector d(m), of dimension N, by multiplying the vector z(m) with a matrix U*, which is the element-wise complex conjugate of the matrix U; 3) adding an L-sample circular prefix to d(m) to produce a vector u(m), i.e., generate a vector u(m) of dimension N+L where the first L entries of u(m) are the last L entries of d(m) and the last N entries of u(m) are the entries of d(m) (in the same order); replacing the (i,j)th entry of B (equal to the complex conjugate of x(m) by assumption) with u(m).

Similarly, according to Table 1, an entry of B equal to the negative of x(m) is replaced by the negative of the vector v(m) constructed above, while an entry of B equal to the negative of the complex conjugate of x(m) is replaced by the negative of the vector u(m) constructed above. Finally, each entry of B that equals zero is replaced by an all-zeros vector of dimension N+L. The resulting OSTBC encodes K (equal to N times k) scalar, complex-valued information bearing symbols over T time slots (at each base station), where T equals t times the sum of N and L. As a result, the rate of the induced OSTBC (equal to K over T) is a fraction N/(N+L) (i.e., N over the sum of N and L) of the baseline OSTBC.

FIG. 6 shows a special case of generating a code to be used with a two-transmit base station system, where each base station has a single transmit antenna per base-station using the Alamouti code as the baseline code. Referring to FIG. 6, the baseline Alamouti code (labeled B), encodes 2 symbols at a time over two samples per antenna at a rate of 1 symbol/channel use, and the associated induced OSTBC, B, encodes 2-times-N symbols at a time over 2-times-(N+L) samples/per base-station, at a rate N/(N+L) symbols/channel use. More specifically, the Alamouti code (depicted via the matrix B in FIG. 6) codes two symbols, x(1) and x(2), over two time slots and two antennas. In the first time slot, the ith antenna (for i=1, 2) transmits symbol x(i), while in the second time slot the first antenna transmits the complex conjugate of x(2) and the second antenna transmits the negative of the complex conjugate of x(1). The induced code is shown with the matrix B in FIG. 6. The signal samples transmitted by the ith base station (for i=1, 2) in time slots 1 through L+N are constructed from the ith block of symbols, s(i), by computing the DFT of s(i) and prepended with a circular prefix (equivalent to OFDM transmission). The samples transmitted by the first antenna at times L+N+1 through 2×(L+N) are generated as follows: (i) apply transformation U on the DFT of s(2); and (ii) prepend the resulting vector of dimension N with its L-sample circular prefix. The samples transmitted by the second antenna at times L+N+1 through 2×(L+N) are similarly constructed according to B.

An Example of an OSTBC Encoder

Figure 7:
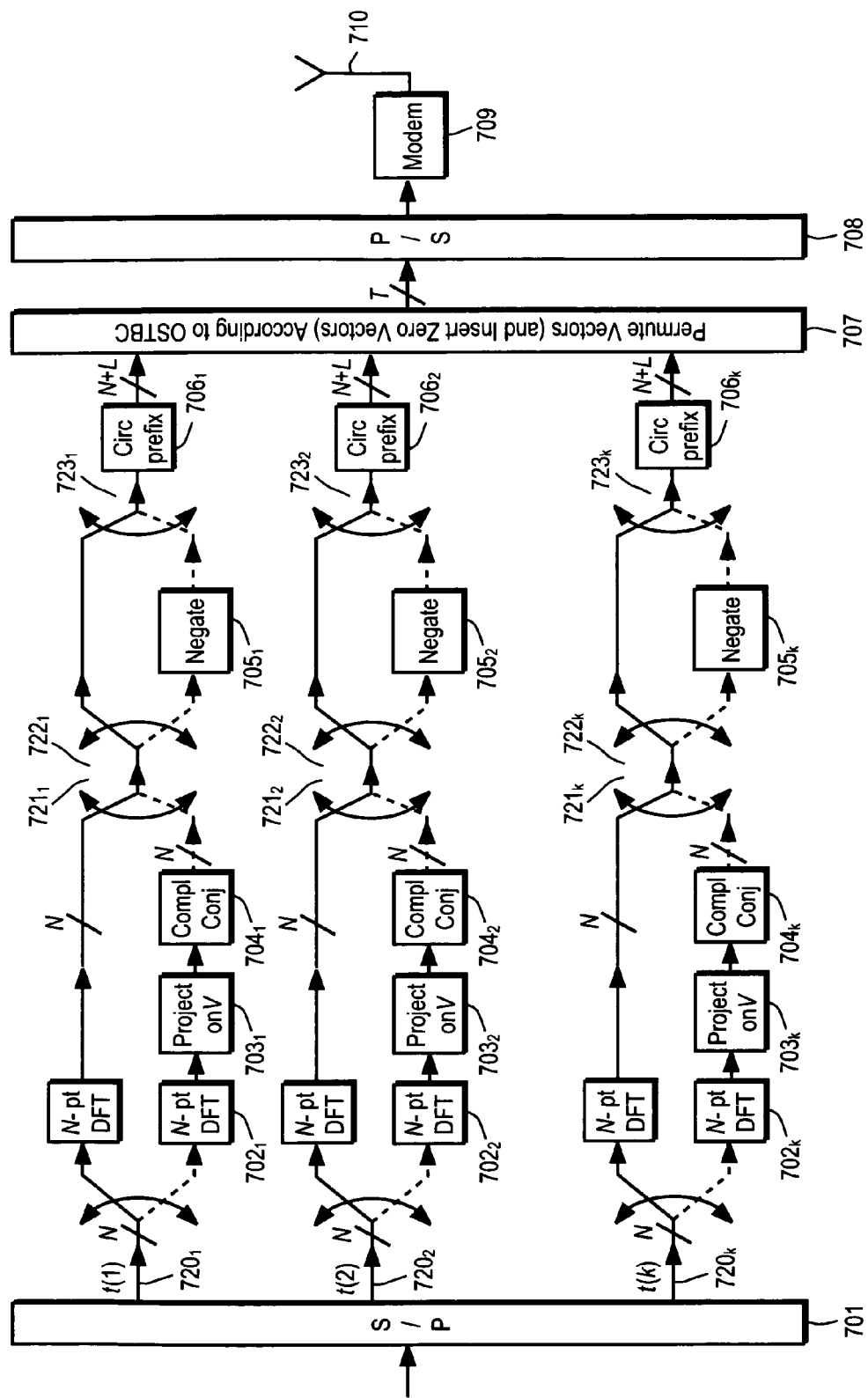
FIG. 7 is a block diagram of one embodiment of an OSTFDM encoder at a base station.

FIG. 7 is a block diagram of one embodiment of an OFDM-based OSTBC encoder used by one of base stations $702_{1-n}$ for encoding for transmission on a typical antenna element. Referring to FIG. 7, the encoder takes as input the information-bearing symbols, or samples generated by an outer code in the system. Encoding is performed in blocks of size K, where K equals k times N. Serial-to-parallel converter 701 splits each block of K symbols into k sub-blocks, information symbol vectors s(1), s(2), . . . , s(k), each of which has N symbols. The processed blocks are then reordered (and zero blocks are inserted where appropriate), and each block is then individually processed as shown in FIG. 7, with the position of switches $720_{1-k}$, $721_{1-k}$, $722_{1-k}$, and $723_{1-k}$ and the reordering operation set according to the OSTBC column associated with the given antenna element. Specifically, regardless of the setting of switch $720_1$, the encoder applies an N-pt IDFT to k sub-block s(1). In the case where switch $720_1$ is set to the lower path, the encoder projects a matrix U $703_1$ onto the transformed data. In one embodiment, matrix U $703_1$ is a time reversal matrix. The encoder performs an element-wise complex conjugate $704_1$ to the results of projecting the transformed data onto matrix U $703_1$. Switch $721_1$ is set to the same path (lower or upper) as switch $720_1$. The results from the selected (upper or lower) path are then directed through, either the upper path of switch $722_1$ (and the upper path of $723_1$, which is always set to the same path as switch $722_1$) to circular prefix unit $706_1$, or through the lower path of switch $722_1$ to "negate" block $705_1$ and through the lower path of switch $723_1$ to circular prefix unit $706_1$. Each of the "negate" blocks $705_{1-k}$ produces at its output a vector of dimension N, whose ith entry (with i=1,2,3, . . . , N) equals minus the ith entry of the input vector. The remainder of the information symbol vectors s(2), . . . , s(k) are processed in the similar fashion.

Circular prefix units $706_{1-k}$ insert an L-sample circular prefix to create an N+L sized processed block. After processing, reorder unit 707 reorders the processed blocks and inserts blocks of zero vectors (each of dimension N+L) where appropriate, and as specified by the column of the induced space-time block code that is associated with the given antenna. For instance, if the code being implemented were the induced code shown in FIG. 9 (in which case k=3, and n=4), the reorder operation for the antenna associated with the $2^{nd}$ column of the matrix, would place first the output of prefix unit $706_2$ followed by the output of prefix unit $706_1$ followed by a vector of N+L zeros, followed by the output of prefix unit $706_3$. In one embodiment, the position of switches in FIG. 7 and the reordering operation are dictated by the column of the OFDM-based OSTBC that is associated with the given antenna element.

Finally, the T-sample vector generated by the reordering/zero insertion operation is passed through parallel-to-serial converter 708 to a modem 709, which performs pulse-shaping, amplification, and modulation to radio-frequency (RF) in a manner well-known in the art. Afterwards, modem 709 sends the data for transmission over antenna element 710.

FIG. 9 demonstrates another example of code constructing an OSTFDM code from an existing baseline code for a four transmit base-station system in which each base station employs a single transmit antenna. In particular, FIG. 9 shows the special case of generating a code to be used with a four transmit-base-station system. Specifically, FIG. 9 shows the baseline OSTBC, B, which encodes 3 symbols over four samples per antenna at a rate of ¾ symbols/channel use, and the associated induced OSTBC, B, which encodes 3-times-N symbols at a time over 4-times-(N+L) samples/per base-station, at a rate ¾ times N/(N+L) symbols/channel use. This code also provides a systematic induced OSTBC for a three transmit-base-station system (e.g., by dropping one of the columns of B). The code can also be used in the context of a two-base station system whereby each base station has two transmit antennas. In this case columns 1-2 of B are associated with the two transmit antennas at the one of the base stations and columns 3-4 are associated with the two transmit antennas at the other base station.

Examples of Base Station Encoders

Figure 8:
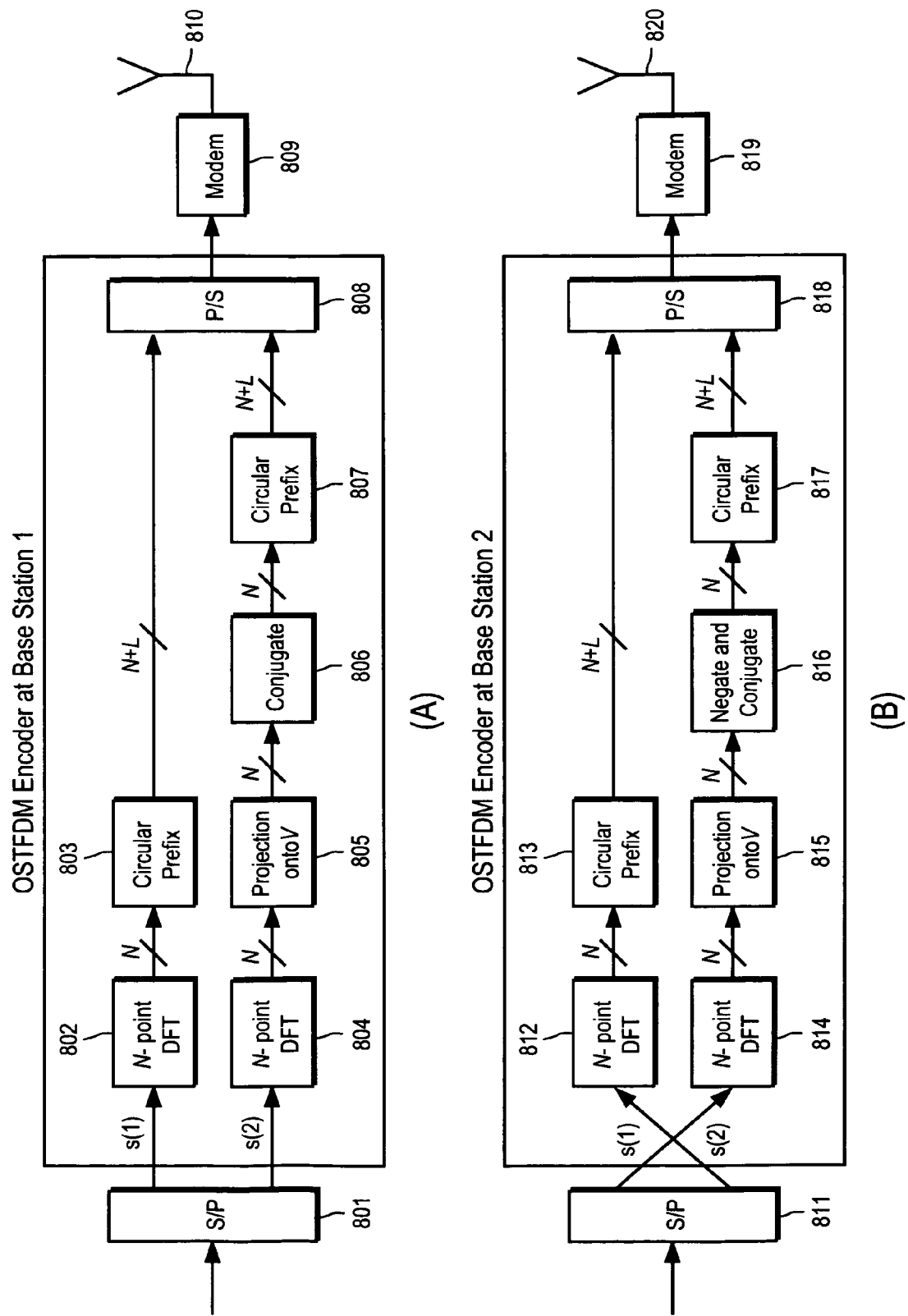
FIGS. 8A and 8B illustrate OSTFDM encoders at two base stations.

FIGS. 8A and 8B are block diagrams of one embodiment of encoders at respective base stations that implement an OSFDM coder. The encoders in FIGS. 8A and 8B support an OFDM-based OSTBC implementation in each base station in a scheme involving transmission from two base stations, each with a single antenna element for transmission. The system takes as input blocks of N (complex-valued scalar) symbols generated by the outer code in the system.

Referring to FIG. 8A, the encoder includes serial-to-parallel converter 801 that receives a set of information symbol vectors s(1) and s(2) of dimension "N" and converts them into parallel form. N-point IDFT 802 transforms the information symbol vector s(1) into N symbols. Circular prefix unit 803 adds a prefix of L bits to the N symbols, thereby creating an N+L set of data that is sent to parallel-to serial-converter 808, where it is converted to a serial steam.

N-point IDFT 804 transforms the information symbol vector s(2) into N symbols. Then projection unit 805 projects the matrix output from N-point IDFT transform 804 onto matrix U. In one embodiment, matrix U is a time-reversal matrix. Conjugate unit 806 performs the conjugate operation on the output of projection unit 805. Circular prefix unit 807 adds a prefix of L symbols onto the conjugated output of conjugate unit 806. The output of circular prefix unit 807 is input to parallel-to-serial converter 808, which converts data on its parallel inputs into serial form. The output of parallel-to-serial converter 808 is sent to modem 809, which causes the data to be transmitted via antenna 810.

In FIG. 8B, the encoder at the second base station is described. Referring to FIG. 8B, the encoder includes serial-to parallel converter 811 that receives a set of information symbol vectors of dimension "N" and converts them into parallel form. N-point IDFT 812 transforms the information symbol vector s(2) into N symbols. Circular prefix unit 813 adds a prefix of L bits to the N symbols, thereby creating an N+L set of data that is sent to parallel-to serial-converter 818, where it is converted to a serial steam.

N-point IDFT 814 transforms the information symbol vector s(1) into N symbols. Then projection unit 815 projects the matrix output from N-point IDFT transform 814 onto matrix U. In one embodiment, matrix U is a time-reversal matrix. Conjugate unit 816 performs the conjugate operation on the output of projection unit 815. Circular prefix unit 817 adds a prefix of L symbols onto the conjugated output of conjugate unit 816. The output of circular prefix unit 817 is input to parallel-to-serial converter 818, which converts data on its parallel inputs into serial form. The output of parallel-to-serial converter 818 is sent to modem 819, which causes the data to be transmitted via antenna 820.

The choice of processing performed on each of the vectors s(i) and represented by the position of the four switches on the sub-system with input s(i) in FIGS. 8A and 8B, as well as the reordering of the processed circularly prefixed vectors is dictated by the baseline code. For instance, in the implementation of the code in FIG. 9, at the $1^{st}$ antenna, all switches are chosen high for processing s(1), low for processing s(2), while in processing s(3) the first (pair) is set low, while the second one is set high. Furthermore, the reordering operation in this case, simply keeps the order the same and appends a zero vector block.

An Example of an OFDM-based Receiver Front-end

Figure 10:
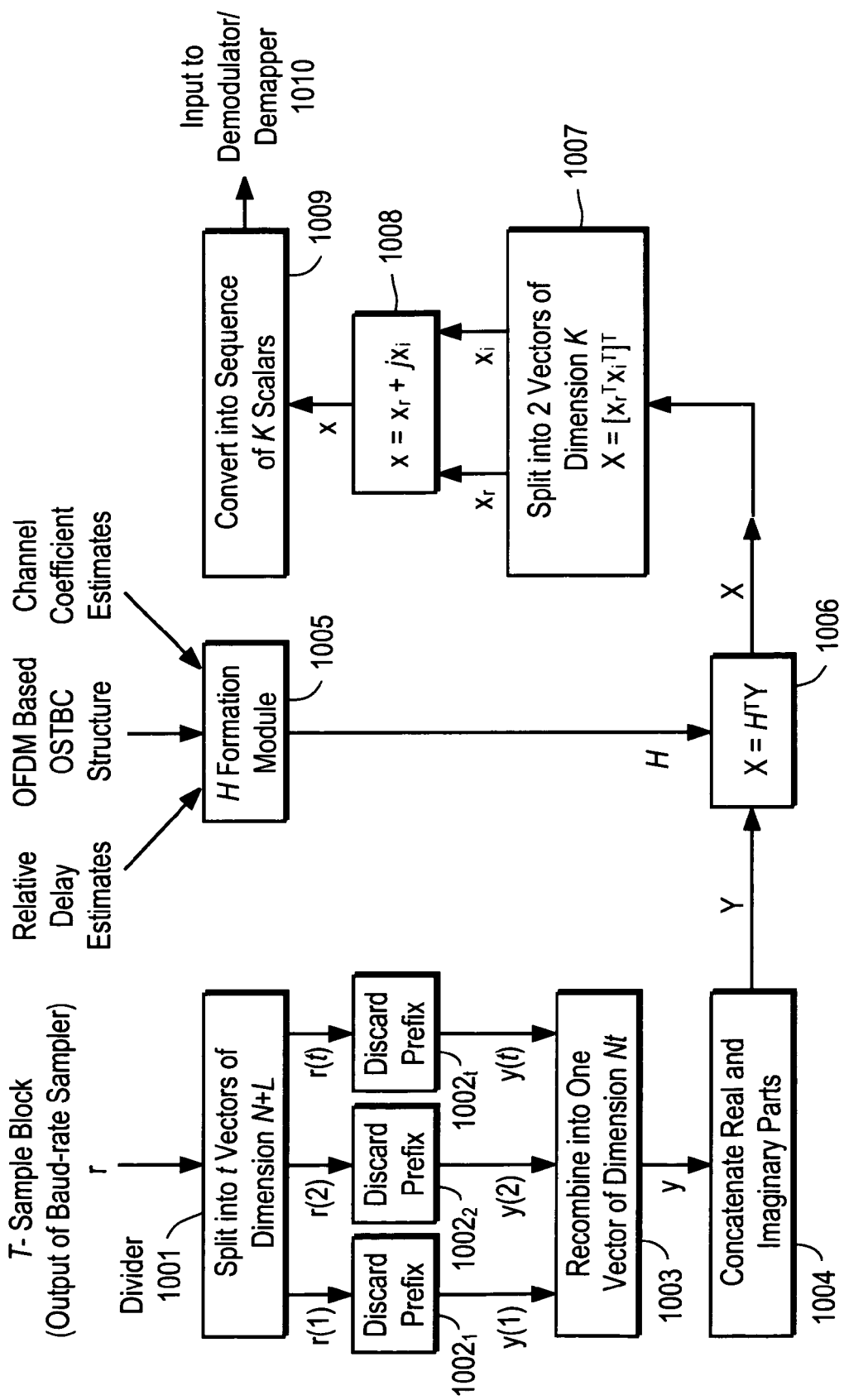
FIG. 10 is a block diagram of one embodiment of a OSTFDM receiver front end.

FIG. 10 is a block diagram of one embodiment of an OFDM-based linear receiver front-end structure. More specifically, the receiver front end generates soft estimates of the input symbols to the inner code. These estimates are then used as inputs to the demodulator/demapper block.

The front-end structure performs a symbol detection algorithm and produces a scalar sequence that is used by the outer decoder for symbol decisions. This algorithm can be readily applied for detection of the information bearing vectors s(1), s(2), . . . , s(k), in the case of data transmission over slowly varying flat fading channels, but can also be applied for symbol detection over slowly-time varying frequency selective channels. In one embodiment, the channel is varying slowly enough so that accurate estimates of the channel fading coefficients can be obtained (via the pilot estimation phase) and that the receiver employs a standard front-end which consists of a linear filter (e.g., a square-root raised cosine pulse matched to the transmitter pulse-shaping filter) followed by a baud-rate sampler (with adjustable sampling times). At the output of the baud sampler, the receiver has available a sequence of samples that is a linear superposition of the responses of all transmitted OSTBC sequences in background noise. It is also assumed that the parameter L has been chosen, so that the effective length of the combined support of the impulse responses of all the channels, from each transmitting base-station to a receiver (viewed at the output of the baud-rate sampler) is at most equal to L samples (including multipath spread and the relative delays in the receptions).

By construction, the effective impulse response of a channel from a transmitting base station to a receiver (viewed at the output of the baud-rate sampler) is at most equal to $L_\delta$ samples long. In one embodiment, the constant $L_6$ is determined by the "effective" duration (in symbol periods) of the response of the pulse-shaping waveform (used at each encoder) through the receiver front-end filter. When square-root raised-cosine pulse-shaping and receiver front-end filters are employed, the value of $L_\delta$ depends on the roll-off factor employed and is typically between four and six. In addition, the first nonzero samples in the impulse responses of any two such channel responses are at most $L_o$ samples apart (due to the assumed $L_o$ maximum relative delay constraint). In one embodiment, in the channel estimation phase, estimates of the relative delays in the transmissions are first obtained, together with estimates of the channel fading coefficients.

Based on these estimates, the receiver of FIG. 10 performs the following operations. Given the relative delay estimates, the block-symbol timing reference is determined and the received sampled sequence is partitioned into blocks of length T. In one embodiment, these operations are performed at the receiver: they are part of the timing-recovery and synchronization operations. Conceptually, the relative delays are first estimated. For this, the transmitting antennas transmit space-time coded sequences generated via pilot signals, which are known to the receiver. The receiver has an analog linear front-end (front-end filtering, demodulation, and sampling) and uses the knowledge of the transmitted signal in order to estimate and readjust its sampling times, which is an operation that is part of timing-recovery. In the asynchronous case, multiple relative delays are estimated, one for each transmit antenna. Then the blocking into r vectors is dictated by determining the beginning of any block as the beginning of the transmitted signal that is arriving first. These relative timing delays change slowly with time, so they can be estimated through a standard pilot-assisted channel estimation phase, used to estimate the channel fading coefficients. This processing is performed on a block-by-block basis. The variable r represents the received vector of concentric samples of dimension T that is associated with the current block of data.

Divider 1001 partitions r into t vectors r(1), r(2), ..., r(t), each of dimension N+L, that is, $r=[r^T(1)\ r^T(2)\ \ldots\ r^T(t)]^T$. For each integer m in the set $\{1, 2, \ldots, t\}$, prefix removal unit 1002 constructs a vector y(m) of dimension N, as the last N entries of the vector r(m), by removing the prefix data. The ith entry of y(m) equals the "L+I" th entry of r(m).

Combiner 1003 constructs a (complex-valued) vector y of dimension Nt (i.e., N times t). In one embodiment, combiner 1003 constructs the vector by appending all the y(i)'s i.e., set $y=[y^T(1)\ y^T(2)\ \ldots\ y^T(t)]^T$ (i.e., the concatenation of y(1), y(2), ..., y(t)). Combiner 1004 constructs a real-valued vector Y of dimension 2Nt (i.e., 2 times N times t) using the output of combiner 1003. In one embodiment, combiner 1004 concatenates the (element-wise) real part of y with the (element-wise) imaginary part of y.

Given knowledge of the fading coefficients, the relative delays, and the induced code structure, the receiver knows that real-valued vector Y can be expressed in the following form: Y=H S+W, where S denotes the real-valued vector of dimension 2K (i.e., 2 times K) that equals the concatenation of the (element-wise) real part of s where s is the vector $s=[s(1), \ldots, s(k),]$ i.e., the vector of all the elements of the k vectors s(1), s(2), ..., s(k) that are the input to the induced code B defined above and the (element-wise) imaginary part of s, H denotes a real-valued matrix with 2Nt (i.e., 2 times N times t) rows and 2K (i.e., 2 times K) columns, which can be readily constructed at the receiver, given knowledge of the fading channel coefficients, relative delays, and the induced code structure, and W is a vector of dimension 2Nt (i.e., 2 times N times t) representing background noise and other forms of interference. Writing the received signal in this form (and thus the associated representation, including the creation of the matrix H) are straightforward operations that are well known in the art.

Using this information, computation unit 1006 computes $X=H^TY$, where X is a real valued vector of dimension 2K (2 times K). Partition unit 1007 partitions X into two K dimensional vectors $x_r$ and $x_i$, as $X=[x_r^T\ x_i^T]^T$. Then adder 1008 constructs a complex-valued K-dimensional vector x as follows: $x=x_r+j\ x_i$, and where j represents the square root of the number −1. Conversion unit 1009 converts x into a sequence of K scalars. This is achieved by extracting the K scalar components out of the vector x (which has dimension K). The output of conversion unit 1009 is an input to the demodulator/demapper.

In one embodiment of the receiver, the estimates of the relative delays at the receiver (available via the channel estimation phase) are used to adjust the sampling timing of the baud-rate sampler at the receiver front-end. Such adjustments can have significant benefits from a receiver performance point of view. For instance, consider the case where a two base-station system is employed and where the relative delay between the received signals equals "half" a symbol period. It can be shown that the receiver performance is improved, and potentially optimized, when the baud-rate sampler is a quarter-sample "behind" one of the transmission and a quarter-sample "ahead" of the other, and takes its worse value when the baud-rate sampler is in-sync with one of the transmissions and half-a-sample out of sync with the other.

In another embodiment, the baud-rate sequence of samples (that is partitioned into r-type vectors of the form shown in FIG. 10) is generated by passing the (down converted continuous-time) received signal through the following cascade of systems that includes: a linear front-end filter (e.g., a square-root raised cosine filter); an oversample-by-M system where M is an integer greater than 1 (this system keeps M samples per symbol period); a discrete-time delay-by-$n_o$-samples system (the output of this system is its input delayed by $n_o$-samples); and a decimate-by-M system (this system generates an output by discarding all by every Mth sample of the input sequence). In this case, the estimates of the relative sampling times (available at the receiver via the pilot phase) can be employed to adjust the (integer) delay parameter $n_o$ in the delay-by-$n_o$ system prior to the decimator in order to optimize the decoder performance.

In another embodiment, the baud-rate sequence of samples (that is partitioned into r-type vectors) by passing the (down converted continuous-time) received signal through the following cascade of systems, which include i. a linear front-end filter (e.g., a square-root raised cosine filter);
ii. an oversample-by-M system where M is an integer greater than 1 (this system keeps M samples per symbol period);
iii. a discrete-time delay-by-$n_o$-samples system (the output of this system is its input delayed by $n_o$-samples);
iv. a decimate-by-M system (this system generates an output by discarding all by every Mth sample of the input sequence);

In this case, the estimates of the relative sampling times (available at the receiver via the pilot phase) can be employed to optimally adjust the (integer) delay parameter $n_o$ in the delay-by-$n_o$ system prior to the decimator in order to optimize the decoder performance.

Preferably, iterative decoding should be used with the demapper (in the decoder of FIG. 3) as SISO 1 (soft in, soft out). The SISO 2 decoder for the outer convolutional code (or the RCPC code in the UEP case) should ideally be a MAP (BCJR) or a maxlog MAP decoder. Note that with the outer code and interleaver some frequency diversity is obtained when communicating over frequency selective channels, since the interleaving and coding takes place also in the frequency domain as well as in the time domain.

The receiver in these schemes is relatively simple because of the inner orthogonal space-time block code that is employed (labeled OSTFDM). Note that the demapper SISO 1 in this case only grows exponentially with the number of bits in the constellations but not with the number of transmit antennas. Note also that a sub-optimum receiver could be a demapper followed by a Viterbi decoder (instead of a MAP decoder and no iterative decoding. It has worse performance than the iterative decoding (ID) algorithm but it has lower decoding complexity.

By employing space-time coded transmission via a set of transmitter antennas distributed over multiple (non-collocated) base stations, extended coverage and reliability can be achieved. The space-time codes using an inner STBC based on OFDM are robust to asynchronous component signals. In addition, the proposed design attains the desired performance benefits by employing a low complexity receiver at each intended mobile receiver. The use of an outer binary convolutional code and bit interleaving makes efficient and robust systems for wideband transmission. Additional frequency diversity is typically obtained and iterative decoding can be employed with the demapper as the inner decoder and the outer decoder being MAP decoder for the RCPC code. (Even in the case of communication over flat fading channels, the iterative decoding structure can provide performance benefits). Finally, the use of an RCPC code as the outer binary convolutional code yields flexible UEP properties. The entire system is quite flexible and robust to changes in the number of transmit and receive antennas as well as modem constellations.

An Example of a Computer System

Figure 11:
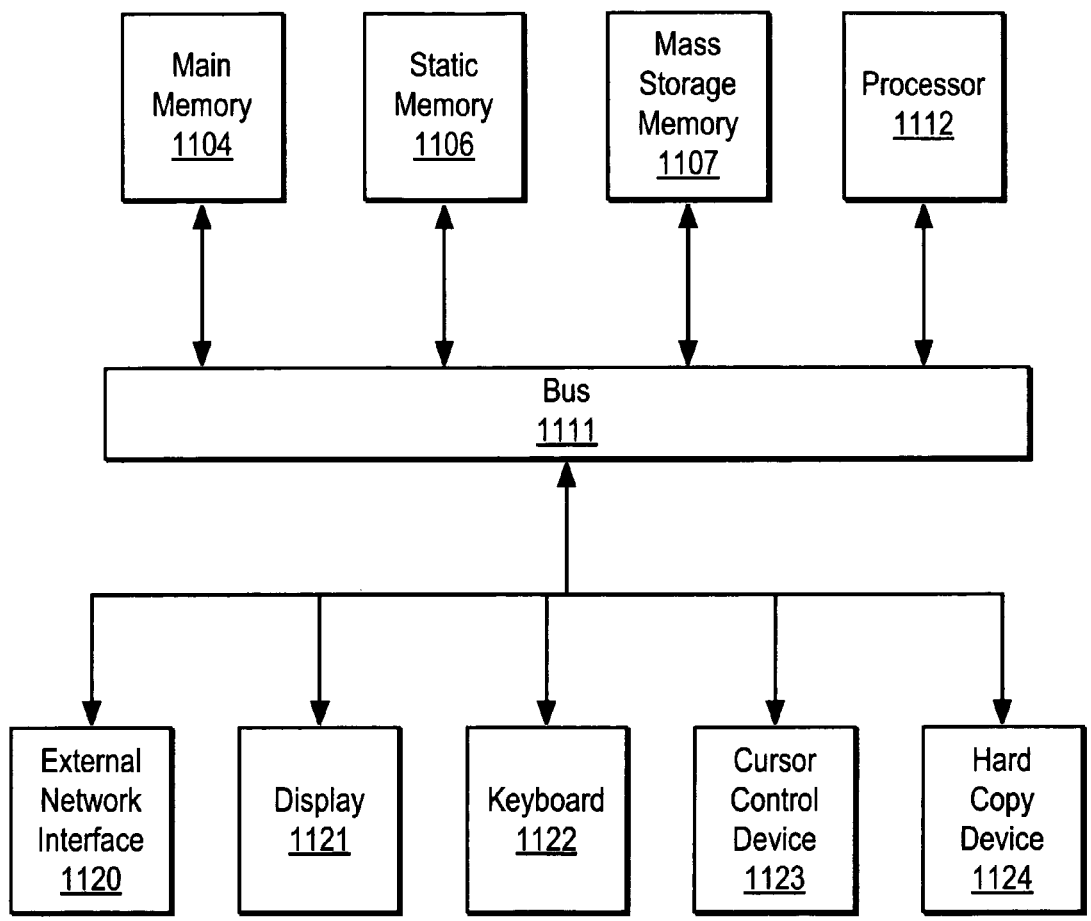
FIG. 11 is a block diagram of one embodiment of a computer system.

FIG. 11 is a block diagram of an exemplary computer system that may perform one or more of the operations described herein. Referring to FIG. 11, computer system 1100 may comprise an exemplary client or server computer system. Computer system 1100 comprises a communication mechanism or bus 1111 for communicating information, and a processor 1112 coupled with bus 1111 for processing information. Processor 1112 includes a microprocessor, but is not limited to a microprocessor, such as, for example, Pentium™, PowerPC™, Alpha™, etc.

System 1100 further comprises a random access memory (RAM), or other dynamic storage device 1104 (referred to as main memory) coupled to bus 1111 for storing information and instructions to be executed by processor 1112. Main memory 1104 also may be used for storing temporary variables or other intermediate information during execution of instructions by processor 1112.

Computer system 1100 also comprises a read only memory (ROM) and/or other static storage device 1106 coupled to bus 1111 for storing static information and instructions for processor 1112, and a data storage device 1107, such as a magnetic disk or optical disk and its corresponding disk drive. Data storage device 1107 is coupled to bus 1111 for storing information and instructions.

Computer system 1100 may further be coupled to a display device 1121, such as a cathode ray tube (CRT) or liquid crystal display (LCD), coupled to bus 1111 for displaying information to a computer user. An alphanumeric input device 1122, including alphanumeric and other keys, may also be coupled to bus 1111 for communicating information and command selections to processor 1112. An additional user input device is cursor control 1123, such as a mouse, trackball, trackpad, stylus, or cursor direction keys, coupled to bus 1111 for communicating direction information and command selections to processor 1112, and for controlling cursor movement on display 1121.

Another device that may be coupled to bus 1111 is hard copy device 1124, which may be used for marking information on a medium such as paper, film, or similar types of media. Another device that may be coupled to bus 1111 is a wired/wireless communication capability 1125 to communication to a phone or handheld palm device.

Note that any or all of the components of system 1100 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A wireless communication system comprising:
one or more terminals; and
at least two base stations wirelessly communicating information-bearing signals, using coding systems, from a set of antenna elements distributed over multiple, non-collocated base stations to the one or more terminals, such that at least one antenna element of the set of antenna elements is located at each of the at least two base stations,
wherein at least one of the coding systems employs a concatenation of an outer binary code, bit interleaved coded modulation, and an induced OFDM-type space-time block code to code one of the information-bearing signals, and wherein the space-time block code is created by systematic transformations of elements of an associated baseline code, where the systematic transformations replace information-bearing symbols in a baseline code matrix representing the baseline code with a vector of information-bearing symbols in an induced code matrix representing the space-time block code.

2. The system defined in claim 1 wherein all transmitting antennas of all of the base-stations that are transmitting are enumerated, and each antenna is assigned a column of the induced code.

3. The system defined in claim 2 wherein a base station associated with each transmit antenna generates a vector for transmission for each block of information-bearing symbols according to a corresponding column of the induced space-time block code.

4. The system defined in claim 1 wherein at least one of the base stations comprises a transmitter having:
an input to receive information bearing signals;
a binary outer code encoder coupled to the input to encode the information bearing signal and generate a bit stream;
a bit-interleaver coupled to the bit stream, and followed by a mapper and a modem, to perform bit-interleaved coded modulation on the bit stream; and
an OFDM-based inner orthogonal space-time block code (OSTBC) encoder coupled to the modem to generate one or more data streams for transmission.

5. The system defined in claim 4 wherein the modem and the OSTBC encoder are coupled via a serial-to-parallel converter that is operable to convert outputs of the bit-interleaver from serial to parallel form.

6. The system defined in claim 4 wherein the binary outer code encoder comprises an encoder that uses a code selected from a group comprising a rate-compatible punctured convolutional (RCPC) code, a turbo code, and a block code.

7. The system defined in claim 4 wherein the OSTBC encoder uses the space-time block code as an induced code, which is derived from an orthogonal space-time block code, the orthogonal space-time block code being a baseline code.

8. The system defined in claim 7 wherein the OSTBC encoder encodes a block vector of multiple symbols, using an induced code, for every scalar information symbol encoded by the baseline code.

9. The system defined in claim 1 wherein at least one of the base stations comprises a receiver having:
a linear front-end having an inner decoder to perform decoding with an OFDM-based inner orthogonal space-time block code (OSTBC) to generate symbols;
an outer decoder having
an inner symbol demapper to perform a symbol-by-symbol demapping of symbols to bits from the linear front-end;
a bit deinterleaver to perform deinterleaving on the demapped symbols received from the inner symbol demapper; and
an outer MAP decoder.

10. A transmitter comprising:
an input to receive information bearing signals;
a binary outer code encoder coupled to the input to encode the information bearing signals and generate a bit stream;

a bit-interleaver coupled to the bit stream, and followed by a mapper and a modem, to perform bit-interleaved coded modulation on the bit stream; and an OFDM-based inner orthogonal space-time block code (OSTBC) encoder coupled to the modem to generate one or more data streams for transmission, wherein the OSTBC encoder employs a concatenation of an outer binary code, bit interleaved coded modulation, and an induced OFDM-type space-time block code to code one of the information-bearing signals, and wherein the space-time block code is created by systematic transformations of elements of an associated baseline code, where the systematic transformations replace information-bearing symbols in a baseline code matrix representing the baseline code with a vector of information-bearing symbols in an induced code matrix representing the space-time block code.

11. The transmitter defined in claim 10 wherein the modem and the OSTBC encoder are coupled via a serial-to-parallel converter that is operable to convert outputs of the bit-interleaver from serial to parallel form.

12. The transmitter defined in claim 10 wherein the binary outer code encoder comprises an encoder that codes based on one selected from a group comprising a rate-compatible punctured convolutional (RCPC) code, a turbo code, and a block code.

13. The transmitter defined in claim 10 wherein the OSTBC encoder encodes a block vector of multiple symbols, using the induced code, for every scalar information symbol encoded by the baseline code.

14. A wireless communication system comprising:
one or more terminals; and
at least two base stations wirelessly communicating information-bearing signals, using coding systems, from a set of antenna elements distributed over multiple, non-collocated base stations to the one or more terminals, such that at least one antenna element of the set of antenna elements is located at each of the at least two base stations,
wherein at least one of the coding systems employs a concatenation of an outer binary code, bit interleaved coded modulation, and an induced OFDM-type space-time block code to code one of the information-bearing signals, and wherein the space-time block code is created from a baseline code, and wherein the induced code is generated by replacing each scalar entry of the baseline code with a vector according to a list of rules comprising:
an entry that is equal to zero is replaced by a vector of zeros;
an entry equal to a given scaled version of a scalar information symbol of the baseline code is replaced by an equally scaled version of a vector generated by multiplying the associated block vector of information symbols of the induced code by a first unitary matrix, followed by prepending to the resulting vector its circular prefix; and
an entry equal to the complex conjugate of a given scaled version of a scalar information symbol of the baseline code is replaced by the element-wise conjugate an equally scaled version of a vector generated by multiplying the associated block vector of information symbols of the induced code by a second unitary matrix, followed by prepending to the resulting vector its circular prefix.

15. The transmitter defined in claim 14, wherein the first unitary matrix comprises a scaled version of a discrete Fourier transform (DFT) matrix, the DFT matrix being a unitary matrix.

16. The transmitter defined in claims 14, wherein the second matrix equals a product of a DFT matrix, a third matrix, and an inverse of the DFT matrix and the first unitary matrix.

17. The transmitter defined in claim 16 wherein: all entries of the first row of the third matrix except the first entry of the first row equal zero; all entries of the second row of the third matrix except the last entry in the second row equal zero; for each subsequent row of the third matrix after the first and second rows, all entries of said each subsequent row equal zero except one entry, where the index of the nonzero entry is one less than the index of the non-zero entry on the immediately preceding row in the third matrix; and all non-zero entries of the third matrix are complex-valued numbers with magnitude equal to one.

18. A base station comprising the transmitter defined in claim 10.

19. A receiver comprising:
a linear front-end having an inner decoder to perform decoding with an OFDM-based inner orthogonal space-time block code (OSTBC) to generate symbols;
an outer decoder having
an inner symbol demapper to perform a symbol-by-symbol demapping of symbols to bits from the linear front-end;
a bit deinterleaver to perform deinterleaving on the demapped symbols received from the inner symbol demapper; and
an outer MAP decoder,
wherein decoding of information bearing symbols at a destination is based on the received signal aggregate from all base-station transmissions, where the linear receiver front end includes the OSTBC decoder that decodes information bearing symbols that are created by an OSTBC encoder that employs a concatenation of an outer binary code, bit interleaved coded modulation, and an induced OFDM-type space-time block code to code one of the information-bearing signals, and wherein the space-time block code is created by systematic transformations of elements of an associated baseline code, where the systematic transformations replace information-bearing symbols in a baseline code matrix representing the baseline code with a vector of information-bearing symbols in an induced code matrix representing the space-time block code.

20. A receiver comprising:
a linear front-end having an inner decoder to perform decoding with an OFDM-based inner orthogonal space-time block code (OSTBC) to generate symbols;
an outer decoder having
an inner symbol demapper to perform a symbol-by-symbol demapping of symbols to bits from the linear front-end;

a bit deinterleaver to perform deinterleaving on the demapped symbols received from the inner symbol demapper; and an outer MAP decoder, wherein decoding of information bearing symbols at a destination is based on the received signal aggregate from all base-station transmissions, where the linear receiver front end performs the following operations:

band-pass filtering of the received signal, followed by down conversion to baseband, followed by sampling at the baud rate, and partitioning into blocks for decoding;

removing all circular prefixes from each block;

converting each block into a block with real-valued entries by replacing each complex-valued entry in each block with two real-values entries (its real and its imaginary part); and filtering, via a real-valued channel filtering matrix generated from estimates of the channel distortions and relative sampling delays, to generate the soft symbol estimates that are used as inputs to the demapper.

* * * * *